US006687674B2

(12) United States Patent
Suzuki et al.

(10) Patent No.: US 6,687,674 B2
(45) Date of Patent: *Feb. 3, 2004

(54) WAVEFORM FORMING DEVICE AND METHOD

(75) Inventors: Hideo Suzuki, Hamamatsu (JP); Masao Sakama, Hamamatsu (JP); Umeyama Yasuyuki, Hamamatsu (JP)

(73) Assignee: Yamaha Corporation, Hamamatsu (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,332

(22) Filed: Jul. 28, 1999

(65) Prior Publication Data

US 2002/0178006 A1 Nov. 28, 2002

(30) Foreign Application Priority Data

Jul. 31, 1998 (JP) .......................................... 10-218277

(51) Int. Cl.[7] ........................... G01L 19/00; G01H 7/00
(52) U.S. Cl. ......................................... 704/268; 84/604
(58) Field of Search ................................ 704/258, 259, 704/260, 261, 262, 263, 264, 265, 266, 267, 268, 269; 84/600, 601, 602, 603, 604, 605, 606

(56) References Cited

U.S. PATENT DOCUMENTS

| | | | | | |
|---|---|---|---|---|---|
| 4,566,117 | A | * | 1/1986 | Suckle | 704/268 |
| 4,635,520 | A | * | 1/1987 | Mitsumi | 84/607 |
| 4,702,142 | A | * | 10/1987 | Deutsch | 84/605 |
| 5,196,639 | A | * | 3/1993 | Lee et al. | 84/603 |
| 5,262,581 | A | * | 11/1993 | Sharp | 84/603 |
| 5,264,657 | A | * | 11/1993 | Takauji | 84/607 |
| 5,369,730 | A | * | 11/1994 | Yajima | 704/267 |
| 5,381,514 | A | * | 1/1995 | Aso et al. | 704/264 |
| 5,672,836 | A | * | 9/1997 | Yoshida | 84/604 |
| 5,680,336 | A | * | 10/1997 | Kaiser | 364/721 |
| 5,740,320 | A | * | 4/1998 | Itoh | 704/267 |
| 6,021,388 | A | * | 2/2000 | Otsuka et al. | 704/268 |
| 6,035,272 | A | * | 3/2000 | Nishimura et al. | 704/258 |
| 6,125,346 | A | * | 9/2000 | Nishimura et al. | 704/258 |
| 6,169,240 | B1 | | 1/2001 | Suzuki | |
| 6,219,637 | B1 | * | 4/2001 | Choi et al. | 704/223 |

FOREIGN PATENT DOCUMENTS

| | | |
|---|---|---|
| JP | 61-209496 | 9/1986 |
| JP | 62-14697 | 1/1987 |
| JP | 3-75697 | 3/1991 |

* cited by examiner

*Primary Examiner*—Richemond Dorvil
*Assistant Examiner*—Abul K. Azad
(74) *Attorney, Agent, or Firm*—Morrison & Foerster LLP

(57) ABSTRACT

Waveform data of a plurality of loop waveforms are prestored along with initial phase information corresponding to the loop waveforms. Two of the loop waveforms are selected and repeatedly read out to thereby form loop-reproduced waveforms corresponding to the selected two loop waveforms. These loop-reproduced waveforms are connected together, for example, through cross-fade synthesis, during which time the phases of the loop-reproduced waveforms are adjusted to match with each other using the corresponding initial phase information. Generation of loop read addresses is carried out in such a way that first and second address signals for reading out first and second loop waveforms, respectively, are caused to loop while maintaining a difference between the first and second addresses corresponding to a difference between the initial phases of the selected loop waveforms. With such arrangements, the loop waveforms can be smoothly combined together in a simplified manner without a need for prestoring waveform data in a previously phase-matched condition, and thus waveform formation rich in controllability and editability is achieved.

18 Claims, 10 Drawing Sheets

SA : START ADDRESS
LS : LOOP START ADDRESS
LL : LOOP LENGTH
WN : NUMBER OF LOOP WAVES
SP : INITIAL PHASE
EA : END ADDRESS

WAVEFORM FORMING DEVICE AND METHOD

BACKGROUND OF THE INVENTION

The present invention relates generally to devices and methods for forming a waveform of a musical tone, voice or other sound on the basis of waveform data read out from a memory, and more particularly to a waveform forming device and method using loop waveforms read out repeatedly. It will be appreciated that the basic principles of the present invention can be applied extensively to every type of equipment, apparatus and methods having the function of generating musical tones, voices or any other sounds, such as automatic musical performance devices, computers, electronic game devices and multimedia-related devices, not to mention electronic musical instruments. Also, let it be assumed that the terms "tone waveform" in this specification are not necessarily limited to a waveform of a musical tone alone but are used in a much broader sense that may embrace a waveform of a voice or any other type of sound.

The so-called "waveform memory readout" technique has already been well known, which prestores waveform data (i.e., waveform sample data) coded in a given coding scheme, such as the PCM (Pulse Code Modulation), DPCM (Differential Pulse Code Modulation) or ADPCM (Adaptive Differential Pulse Code Modulation), and then reads out the thus-prestored waveform data at a rate corresponding to a desired tone pitch to thereby form a tone waveform. So far, various types of "waveform memory readout" technique have been proposed and known in the art, most of which are directed to forming a waveform covering from the start to end of a tone. As one specific example of the waveform memory readout" technique, there has been known prestoring waveform data of a complete waveform of a tone covering from the start to end thereof. As another example, there has been known an approach of prestoring waveform data of a complete waveform for an attack portion of a tone presenting relatively complex variations and prestoring a predetermined loop waveform for a sustain portion presenting not many variations (e.g., Japanese Patent Laid-open Publication No. SHO-59-188697). In the latter approach, the arrangement of storing the loop waveform for the sustain portion can significantly reduce the quantity of the waveform data to be stored, and also the arrangement of repeatedly reading out the stored loop waveform can effectively adjust the sustained time of the tone as desired. In this specification, the terms "loop waveform" are used to refer to a waveform to be read out repeatedly, i.e., in a looped fashion, and the terms "loop-reproduced waveform" are used to refer to a waveform obtained (reproduced) by reading out the loop waveform repeatedly or in a looped fashion.

Also known in the art is a technique using a plurality of loop waveforms to generate a single tone, where the loop waveforms are read out one after another in given sequence and the resultant loop-read-out data of the successive loop waveforms (i.e., loop-reproduced waveforms) are then subjected to cross-fade synthesis for smooth connection between the individual loop-reproduced waveforms (e.g., Japanese Patent Laid-open Publication No. SHO-62-14696). In this case, the cross-fade synthesis is effected in predetermined cross-fading sections; however, unlike the above-discussed technique of repeatedly reading out just a single simple loop waveform, this technique is not arranged to variably adjust the time lengths of the individual cross-fading sections. Further, in this case, it is absolutely necessary that the waveforms to be subjected to the cross-fade synthesis should be in phase with each other (or at least not greatly phase-shifted with each other) and thus the loop waveform data previously matched in phase should be prestored in memory.

However, the conventionally-known tone waveform forming techniques using the loop waveforms are not satisfactory in that, for the purpose of synthesis or connection between the loop waveforms, they would require burdensome operations of prestoring, in the memory, the waveform data having been previously matched in phase. This means that the conventional technique are unable to smoothly synthesize or connect the loop waveforms that have not been matched in phase with each other, and therefore it was not possible, in the past, to freely edit waveforms and create desired sounds by freely combining together desired loop waveforms. Further, although the conventional tone waveform forming techniques using the loop waveforms can suitably reduce the quantity of waveform data to be stored, they are not suitable for use in forming tone waveforms rich in expression and are also irrelevant to formation of tone waveforms taking "articulation" (style of performance or rendition) of sounds into account. Besides, the conventional tone waveform forming techniques using the loop waveforms are only capable of looping in a preset manner and thus lacks controllability and editability.

SUMMARY OF THE INVENTION

It is therefore an object of the present invention to provide a device and method for forming a tone waveform using loop waveforms which can smoothly combine (synthesize or connect) the loop waveforms in a simplified manner without a need for prestoring waveform data having been previously matched in phase.

It is another object of the present invention to provide a waveform forming device and method which permit free waveform editing and sound making by freely combining desired loop waveforms.

It is still another object of the present invention to provide a waveform forming device and method which are rich in controllability and editability.

According to a first aspect of the present invention, there is provided a waveform forming device which comprises: a storage section for storing waveform data of a plurality of loop waveforms to be read out repeatedly and also storing phase management information in corresponding relation to the loop waveforms; and a waveform forming section for forming a waveform of at least part of a sound, by selecting at least two of the loop waveforms stored in the storage section, repeatedly reading out the waveform data of the selected loop waveforms to thereby form loop-reproduced waveforms corresponding to the selected loop waveforms and combining together the loop-reproduced waveforms. The waveform forming section performs phase adjustment between the loop-reproduced waveforms to be combined together, using the phase management information corresponding to the selected loop waveforms.

In the present invention, the storage section stores not only waveform data of a plurality of loop waveforms but also phase management information corresponding to the loop waveforms, so that the loop waveforms can be smoothly combined (connected or synthesized) with each other in a simplified manner without a need for prestoring the waveform data in a previously-phase-matched condition. Further, even when the loop waveforms to be combined together are shifted from each other in phase (particularly, in the phase of their start points), their different phases can be controlled to coincide with each other by performing phase adjustment between the loop-reproduced waveforms, to be combined together, with reference to the respective phase management information. As a consequence, free waveform editing and sound making are permitted by freely combining any desired ones of the loop waveforms. In addition, the present invention can significantly reduce the burden involved in the waveform formation, because it can eliminate the need for prestoring in memory the waveform data having been previously matched in phase.

In one implementation, each of the phase management information includes information that is indicative of a phase of the start point or end point of the loop waveform corresponding thereto. When the loop-reproduced waveforms are to be combined through cross-fade synthesis, the loop-reproduced waveforms can be appropriately matched in phase with each other, using the information indicative of the respective start points of the loop waveforms. When the loop-reproduced waveforms are to be combined with each other in a simple tandem fashion, the loop-reproduced waveforms can be smoothly connected together with their phases at the connecting point appropriately matched with each other, using the information indicative of the phase of the end point of the preceding loop waveform and the information indicative of the phase of the start point of the succeeding loop waveform.

In another implementation, the information indicative of the phase of the start point or end point may be expressed in relative phase; that is, this information may be expressed either in absolute phase or in relative phase, depending on the application intended. When a pair of certain loop waveforms are to be combined together, the phases of these loop waveforms can be matched with each other on the basis of the absolute phases at the start or end points of their respective waveform data; however, the phases of these loop waveforms can also be matched with each other on the basis of the phase information expressed in relative phase, because the phase relationship or phase difference between the loop waveforms can also be known from the relative phases.

In still another implementation, the phase management information may include information indicative of a location corresponding to a predetermined reference phase of the loop waveform. For example, assuming that the predetermined reference phase is a zero phase, the loop waveform can be matched in phase with another loop waveform if it is known at which point (address location in memory) the zero phase is present.

In yet another implementation, the waveform forming section may form a waveform of at least part of a sound by arithmetically synthesizing (e.g., cross-fade synthesizing) the loop-reproduced waveforms. Alternatively, the waveform forming section may form a waveform of at least part of a sound by connecting together the loop-reproduced waveforms.

According to a second aspect of the present invention, there is provided a waveform forming device which comprises: a storage section for storing waveform data of a plurality of loop waveforms to be read out repeatedly; and an address generation section for generating looping address signals to repeatedly read out the waveform data of the loop waveforms stored in the storage section. The loop waveforms stored in the storage section have given initial phases respectively. The address generation section causes a first address signal for reading out the waveform data of a first one of the loop waveforms and a second address signal for reading out the waveform data of a second one of the loop waveforms to loop in different manners corresponding to a difference between the initial phases of the first and second loop waveforms so that first and second loop-reproduced waveforms, formed as the waveform data of the first and second loop waveforms are repeatedly read out in accordance with the first and second address signals, are adjusted in phase. Then, a waveform of at least part of a sound is formed by combining the first and second loop-reproduced waveforms having been adjusted in phase by the address generation section.

By thus causing the read addresses to loop in different manners corresponding to a difference between the initial phases of the first and second loop waveforms, the phases of the first and second loop-reproduced waveforms, formed on the basis of the looped or repeated readout of the waveform data of the first and second loop waveforms, can be adjusted to be matched with each other. Thus, with this arrangement too, the present invention allows the loop waveforms to be smoothly combined (connected or synthesized) with each other in a simplified manner without a need for prestoring the waveform data having been previously matched in phase. Further, even when the loop waveforms to be combined are shifted from each other in phase, their phases can be appropriately matched by an advancing deviation between the address signals. As a consequence, free waveform editing and sound making are permitted by freely combining any desired ones of the loop waveforms. In addition, the present invention can significantly reduce the burden involved in the waveform formation because it can eliminate the need for prestoring the waveform data in a previously phase-matched condition.

With the waveform forming device according to the second aspect of the present invention, it is not necessarily essential to prestore phase management information in the storage section as in the first-aspect waveform forming device. Although such phase management information may of course be prestored in the storage section, the second-aspect waveform forming device can determine a phase difference between the first and second loop waveforms by just analyzing the phase relationship between the two loop waveforms via a correlation function or the like.

The present invention may be implemented not only as a device invention but also as a method invention. Further, the present invention may be practiced as a computer program and as a recording medium storing such a computer program. Furthermore, the present invention may be embodied as a recording medium storing waveform data in a novel data structure.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Figure 1:
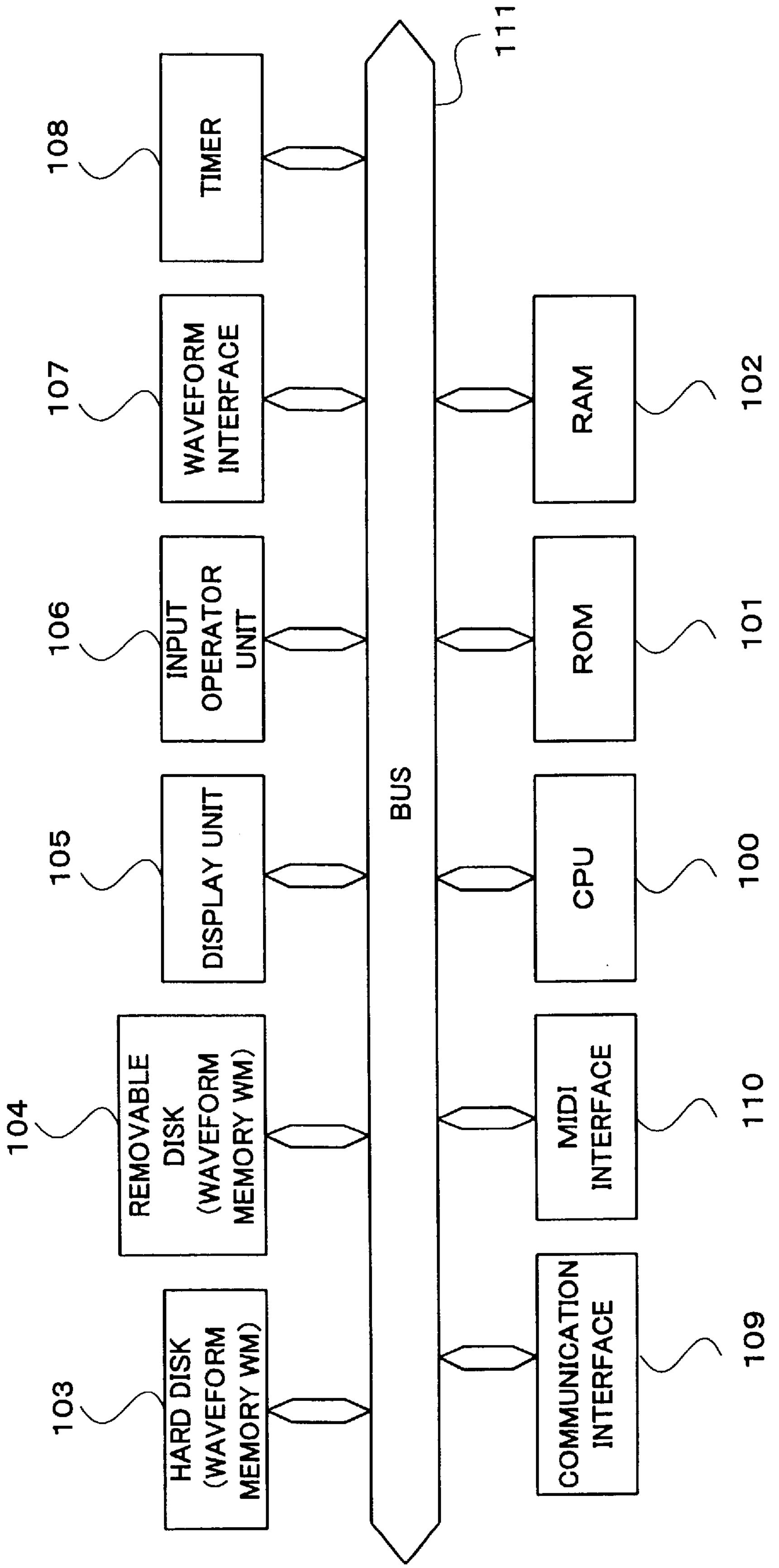
FIG. 1 is a block diagram showing an exemplary hardware organization of a waveform forming device in accordance with a preferred embodiment of the present invention.

FIG. 1 is a block diagram showing an exemplary hardware organization of a waveform forming device in accordance with a preferred embodiment of the present invention. The waveform forming device illustrated in this figure is constructed using a computer, and predetermined waveform forming processing is carried out here by the computer executing a predetermined waveform forming program (software). Of course, the waveform forming processing may be implemented by microprograms for execution by a DSP (Digital Signal Processor), rather than by such computer software. Also, the waveform forming processing may be implemented by a dedicated hardware device that includes discrete circuits or integrated or large-scale integrated circuit. Further, the waveform forming device may be implemented as an electronic musical instrument, karaoke device, electronic game device, multimedia-related device, personal computer or any other form of product.

In FIG. 1, the waveform forming device in accordance with the preferred embodiment includes a CPU (Central Processing Unit) 100 functioning as a main control section of the computer, to which are connected, via a bus 111, a ROM (Read-Only Memory) 101, a RAM (Random Access Memory) 102, a hard disk device 103, a removable disk device (such as a CD-ROM drive or MO drive) 104, a display unit 105, an input operator unit 106 including a keyboard and a mouse, a waveform interface 107, a timer 108, a communication interface 109, a MIDI interface 110, etc. The waveform interface 107 has a function of receiving an analog waveform signal (audio signal) from outside the waveform forming device, converting the received waveform signal into digital representation and then passing the converted digital signal to the bus 111, and a function of receiving, via the bus 111, digital waveform data generated by the computer executing the waveform forming processing and outputting the digital waveform data to a speaker system or the like after converting the waveform data into analog representation. Of course, the digital waveform data generated through the waveform forming processing may be output from the waveform forming device without being converted into analog representation.

In the case where the waveform forming device is embodied as a musical instrument, then the input operator unit 106 includes a performance keyboard for selectively designating desired tone pitches. On the other hand, in the case where the waveform forming device is embodied as a product other than a musical instrument, a MIDI keyboard module is connected to the MIDI interface 110 so that desired tone pitches can be selectively designated through the MIDI keyboard module. Alternatively, desired tone pitches may be selectively designated via automatic performance data. The automatic performance data may either be supplied by reading out the data stored in any of the ROM 101, RAM 102, hard disk device 103, removable disk device 104, etc. or be supplied from an external source via the MIDI interface 110. As conventionally known in the field of electronic musical instruments, various switches and other operators for selecting and setting various tonal factors, such as tone colors, effects, volume levels, are provided on the input operator unit 106 as necessary, although not described here in detail. Selection and setting of these tonal factors may be done via the automatic performance data in a similar manner to the tone pitch designation.

Function of a waveform memory WM storing waveform data may be assigned to any type of data storage device. Namely, any of the ROM 101, RAM 102, hard disk device 103 and removable disk device 104 may be caused to function as the waveform memory WM. In general, given storage areas of the hard disk device 103 having a large capacity or a removable recording medium, such as a CD-ROM or MO, removably attachable to the removable disk device 104 may be caused to function as the waveform memory WM or as a waveform database. Alternatively, the waveform forming device may access a waveform database provided in an external host or server computer via the communication interface 109 and a communication line, so as to download necessary waveform data into the hard disk device 103, RAM 102 or the like.

The above-mentioned software program for executing the waveform forming processing of the invention under the control of the CPU 100 may be prestored in the ROM 101, RAM 102 or hard disk device 103. Alternatively, this software program may be stored in a removable recording medium, such as a CD-ROM or MO, removably attachable to the removable disk device 104, or may be received from an external host or server computer via the communication interface 109 and a communication line and downloaded into the hard disk device 103, RAM 102 or the like.

In the above-mentioned waveform memory WM, there are prestored waveform data of a plurality of “unit waveforms”. Here, the terms “unit waveform” refer to one unit of waveform that can be selected per designation. The unit waveforms may be classified into a plurality of types, according to both their musical or emotional meaning and their technical meaning based on the way in which the waveform data are read out from the memory. More specifically, the classification according to the technical meaning is based on whether or not the waveform data are read out in a repeated or looped fashion; for convenience of description, each unit waveform whose waveform data are read out repeatedly will hereinafter be called a “loop waveform”, while each unit waveform whose waveform data are not read out repeatedly will hereinafter be called a “non-loop waveform”. The classification according to the musical or emotional meaning, on the other hand, is based on in which portion or section of a sound the waveform can be suitably used. For example, each unit waveform which is suitable for use in the rising or attack portion of a sound may be named an “attack portion waveform”, each unit waveform which is suitable for use in the falling or release portion of a sound may be named a “release portion waveform”, each unit waveform which is suitable for use in the sustain portion of a sound may be named a "sustain portion waveform", each unit waveform which is suitable for use in a connecting portion between sounds in a particular style of rendition, such as a slur, may be named a "connecting rendition waveform", each unit waveform which is suitable for use in the sustain portion of a sound according to a particular style of rendition, such as a vibrato or tremolo, may be named an "intermediate rendition waveform", and so on.

Generally speaking, for a portion where delicate articulation (style of rendition) is required, it is desirable that one or more unit waveforms to be used include a "non-loop waveform segment" capable of strongly expressing the unique characteristics of the articulation (style of rendition). Each non-loop waveform is normally composed of a plurality of wave cycles that are necessary and sufficient for expressing the unique characteristics of the articulation (style of rendition). For a relatively monotonous portion of a tone, on the other hand, it is preferable to use a loop waveform with a view to saving the quantity of the waveform data to be stored. Each loop waveform is normally composed of a single or a plurality of wave cycles. The loop waveform itself can be used as a unit waveform for a relatively monotonous sound portion, e.g., as a "sustain portion waveform". In such a case, a waveform of the sustain portion of a continuing sound may be formed by sequentially combining a plurality of the unit waveforms; this approach is very advantageous in that the combination of the unit waveforms can significantly improve the quality of the sound. Further, when it is desired to smoothly connect successive unit waveforms, the "loop waveform" can also be advantageously used in the connecting portion between the unit waveforms. Thus, even with a unit waveform containing a "non-loop waveform" segment, it is preferable that the unit waveform include a "loop waveform" segment preset at the beginning or end thereof that would become a connecting portion with another unit waveform. There may also be unit waveforms comprising a "non-loop waveform" segment alone, in which case the connection with another unit waveform can be effected smoothly by performing an appropriate phase-matching operation at the connecting point.

Figure 2A:
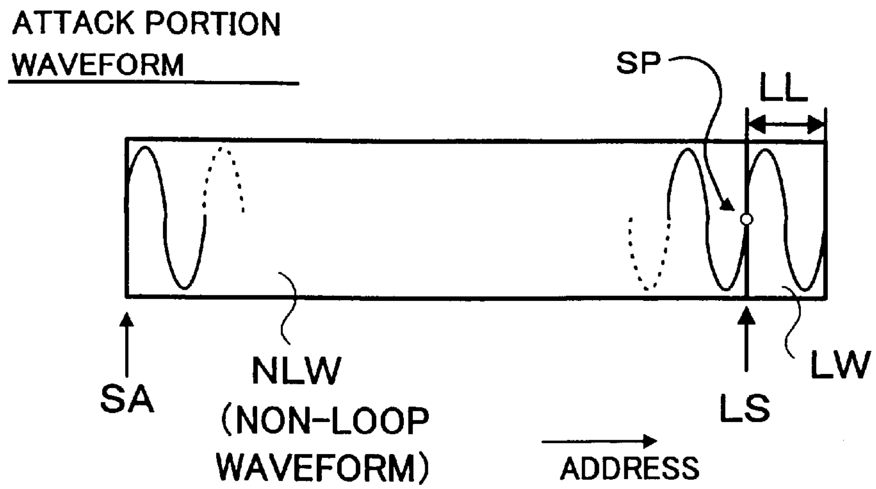
FIGS. 2A to 2C are conceptual diagrams illustrating several specific examples of unit waveforms stored in a waveform memory of FIG. 1.
Figure 2B:
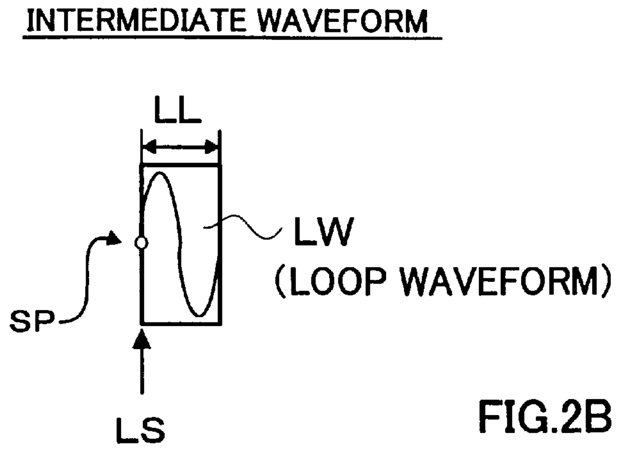
Figure 2C:
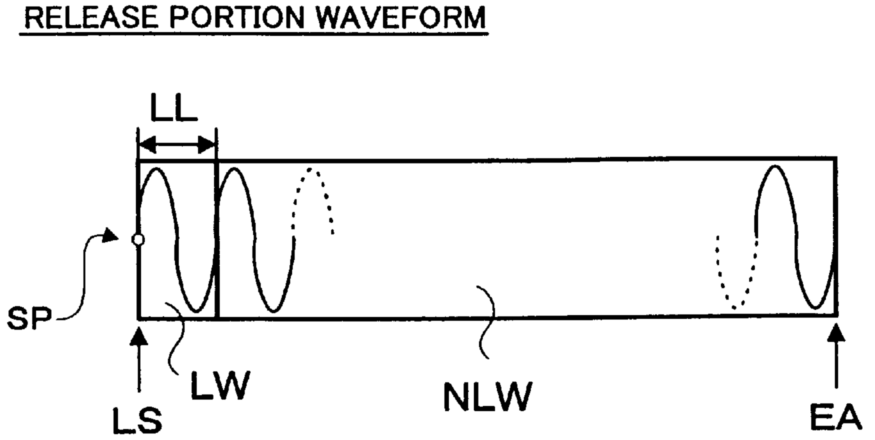

FIGS. 2A to 2C are schematic diagrams illustrating typical examples of the unit waveforms stored in the waveform memory WM. Here, for simplicity of illustration, the unit waveforms are shown only partially, and only the general outlines of the waveforms are shown within a rectangular box. Note that in the illustrated examples, the unit waveforms are stored with their amplitude peak levels normalized to a predetermined value and a given amplitude envelope is imparted to each of the waveforms when the waveform is read out from the memory at the time of reproduction. Of course, the present invention is not so limited; instead, the unit waveforms may each be stored with a desired amplitude envelope imparted thereto, and hence without the amplitude peak levels normalized. In FIG. 2, the horizontal axis represents the address of the memory. Let's assume here that the waveform data of each of the unit waveforms stored in the memory WM are in pulse code modulated (PCM) form, although the waveform data may be in any other coded form than the PCM, such as the DPCM or ADPCM.

More specifically, FIG. 2A shows an example of an attack portion waveform, which is composed of a preceding non-loop waveform segment NLW and a succeeding or trailing loop waveform segment LW. The start point of this attack portion waveform in the waveform memory WM is specified by a given start address SA, and the start point of the loop waveform segment LW is specified by a given loop start address LS.

FIG. 2B shows an example of a unit waveform classified as an intermediate waveform such as a sustain portion waveform, and this intermediate waveform is composed of a single loop waveform segment LW alone. The start point of this intermediate waveform, and hence the loop waveform segment LW, in the waveform memory WM is also specified by a given loop start address LS. Note that the unit waveform classified as such an intermediate waveform is not limited to the illustrated example and may include a non-loop waveform segment; for example, a single unit waveform may be constructed by placing loop waveform segments immediately before and after a predetermined non-loop waveform segment.

FIG. 2C shows an example of a release portion waveform, which is composed of a leading or preceding loop waveform segment LW and a succeeding non-loop waveform segment NLW. The start point of this release portion waveform, and hence the loop waveform segment LW, in the waveform memory WM is specified by a given loop start address LS. Further, the end point of the release portion waveform is specified by a given end address EA. As noted above, the attack portion waveform or the release portion waveform may be composed of a non-loop waveform segment NLW alone without including a loop waveform segment LW.

FIGS. 2A to 2C also show various management information LS, LL, WN and SP for managing the individual loop waveform segments LW. The loop start address LS, as mentioned above, is the address of the loop waveform segment LW which represents a start address of repeated or looped readout. The loop length data LL represents the length of the loop waveform segment LW by the number of addresses. From a combination of the loop start address LS and the loop length data LL ("LS+LL"), it is possible to specify the loop end address (i.e., the end address of the looped readout). Therefore, the repeated or looped readout of the loop waveform segment LW is carried out by repetitively reading out the waveform data from the loop start address LS to the loop end address ("LS+LL").

The number-of-waves data WN represents the number of waves, i.e., cycles, constituting the loop waveform segment LW in question. As previously stated, the loop waveform segment LW may comprise a plurality of waves or cycles rather than a single wave or cycle. According to the described embodiment, the number of waves (WN) and number of addresses (LL) of each loop waveform segment LW may be selected as desired in the described embodiment, so that when loop waveform segments different in the number of waves (WN) and number of addresses (LL) are to be connected together by cross-fade synthesis, the respective readout rates of the loop waveform segments are adjusted, using these data WN and LL, to cause the pitches of the resultant loop-reproduced waveforms to coincide with each other, as will be later described in detail. Such an arrangement for permitting cross-fade synthesis between the loop waveform segments different in the number of waves (WN) and number of addresses (LL) will greatly facilitate and expedite free combinations of the loop waveforms, thereby enhancing the controllability and editability during the waveform forming processing.

The initial phase information SP indicates, in absolute phase representation, the phase of the waveform sample data at the beginning of the loop waveform LW in question that is stored in association with the loop start address LS. Namely, according to the described embodiment, there is no need to prestore the waveform data with the respective initial phases of the individual loop waveforms LW previously matched with each other; instead, the initial phase information SP of the loop waveform waveforms LW is prestored in the waveform memory WM in corresponding relation to the respective waveform data of the individual loop waveforms LW, so that in combining (connecting or cross-fade synthesizing) the loop waveforms, appropriate phase matching can be effected by performing necessary management, such as phase adjustment, using the initial phase information SP. With this arrangement, the need for previously matching the respective initial phases of the individual loop waveforms LW can be eliminated, and therefore the utility of the loop waveforms LW and compatibility of the loop waveforms LW with other databases can be enhanced, which would achieve extremely advantageous results. It will also be appreciated that any other phase management information than the initial phase information SP may be prestored in the waveform memory WM in association with the waveform data of the loop waveforms LW. For example, end phase information indicative of the phase at the end point, i.e., the waveform data corresponding to the loop end address (LS+LL), of the loop waveform LW may be used as such phase management information. Further, the initial phase information SP or other phase management information, such as the end phase information, may be expressed in relative phase rather than in absolute phase. For instance, the relative phase may be expressed by a difference of the initial phase (or end phase) relative to a reference phase represented by a given reference phase value. Furthermore, although it is assumed here that the phase management information, such as the initial phase information SP or the end phase information, in this embodiment is expressed by the unit of "radian", the phase management information may be expressed by indirect phase representation such another form of angular value or the number of addresses. Furthermore, the phase management information in the described embodiment is not limited to the one indicative of the initial or end phase of the loop waveform LW, and may be one indicative of a memory address at which is located the waveform sample data of a predetermined reference phase (e.g., zero phase) in the loop waveform LW in question.

Figure 3A:
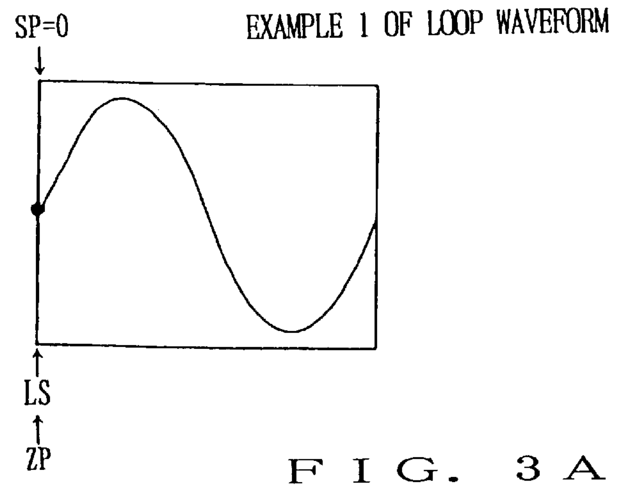
FIGS. 3A to 3C are diagram showing several specific examples of loop waveforms having given initial phases.
Figure 3B:
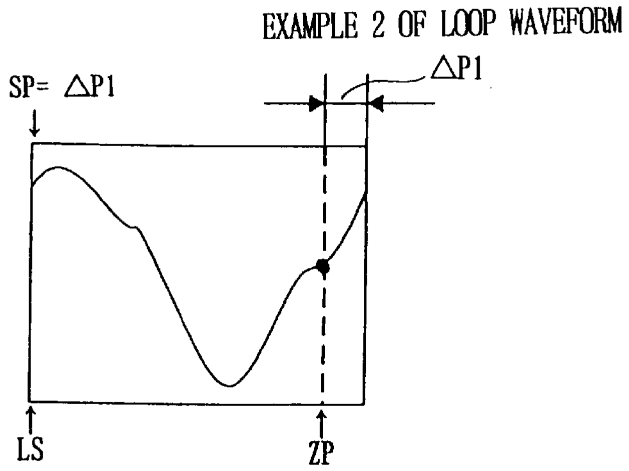
Figure 3C:
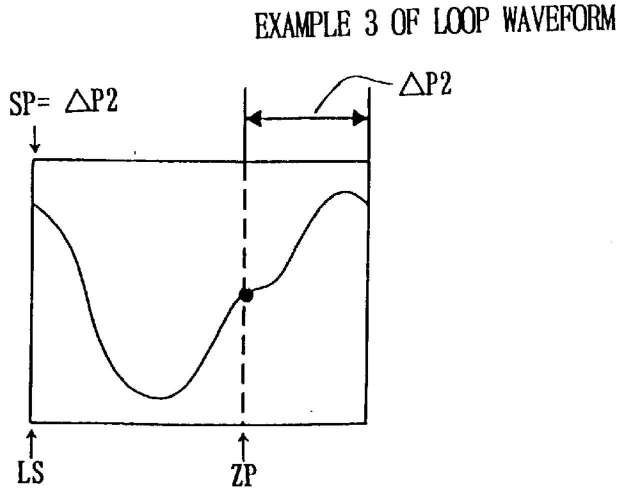

FIGS. 3A to 3C are diagrams showing several examples of the loop waveforms on enlarged scale. More specifically, FIG. 3A shows example 1 of the loop waveform where the initial phase information SP is a value "0", FIG. 3B shows example 2 of the loop waveform where the initial phase information SP is "ΔP1", and FIG. 3C shows example 3 of the loop waveform where the initial phase information SP is "ΔP2". Points denoted by black dots each correspond to the zero phase (absolute phase value "0"). Also assume that the number of waves WN is "1" in each of the illustrated examples. Because the initial phase information SP is in the absolute phase representation in each of the illustrated examples, SP=0 in the case where the initial phase information is "0" as shown in FIG. 3A, SP=ΔP1 in the case where the initial phase information is "ΔP1" as shown in FIG. 3B, and SP=ΔP2 in the case where the initial phase information is "ΔP2" as shown in FIG. 3C. If, however, the initial phase information SP is represented by a relative phase determined using the absolute phase value ΔP1 as the reference phase, SP=2π−ΔP1 in the example of FIG. 3A, SP=0 in the example of FIG. 3B, and SP=ΔP2−ΔP1 in the example of FIG. 3C. In these illustrated examples, a zero-phase address ZP indicates the address at which there is located the waveform sample data of the zero phase (predetermined reference phase) in the loop waveform LW in question. As clearly seen from the diagrams, the initial phase of each of the loop waveforms can be expressed using such a zero-phase address ZP. The zero-phase address ZP may be represented by a relative value to the loop start address LS, and the phase management information may be in any other suitable representation.

Figure 4A:
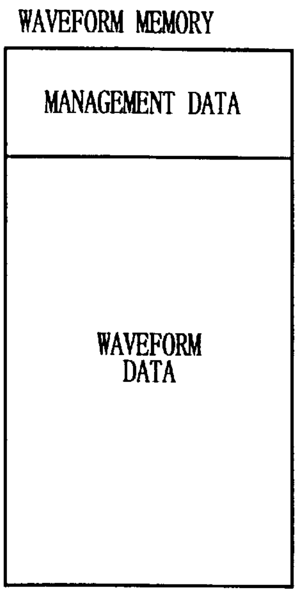
FIGS. 4A to 4E are diagrams showing exemplary storage formats of the waveform memory and an example of waveform sequence data.

FIG. 4A is a diagram outlining a general storage format in the waveform memory WM, which, as shown, is composed of a management data area and a waveform data area. The waveform data area is provided for individually storing the waveform data (specific waveform sample data) of a multiplicity of the unit waveforms as described above. The management data area is provided for storing various management information necessary for the individual waveform data stored in the waveform data area.

Figure 4B:
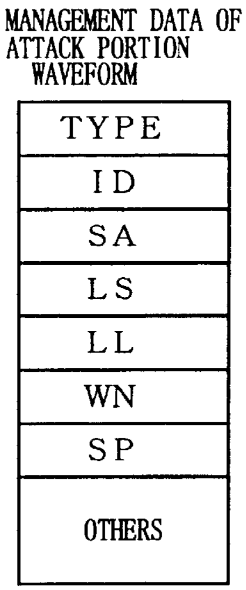
Figure 4C:
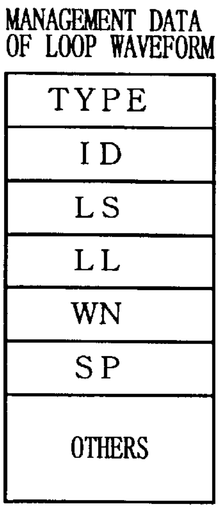
Figure 4D:
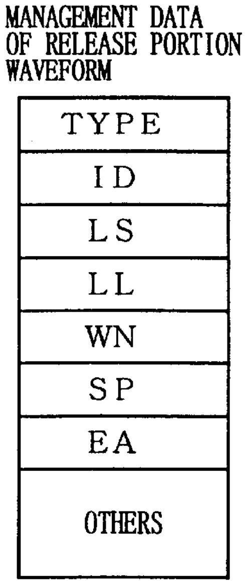

FIGS. 4B to 4D are diagrams showing exemplary storage formats of the management data stored in the waveform memory WM, for several types of unit waveforms. More specifically, FIG. 4B shows an example of the management data for an attack portion waveform including a non-loop waveform segment NLW and a loop waveform segment LW, FIG. 4C shows an example of the management data for an intermediate waveform including a loop waveform segment LW alone, and FIG. 4D shows an example of the management data for a release portion waveform including a loop waveform segment LW and a non-loop waveform segment NLW. In the illustrated examples, type data TYPE is indicative of a particular type of the unit waveform in question. The type data TYPE in the example of FIG. 4B indicates that the associated unit waveform is an "attack portion waveform including a non-loop waveform segment NLW and a loop waveform segment LW", the type data TYPE in the example of FIG. 4C indicates that the associated unit waveform is an "intermediate waveform including a loop waveform segment LW alone", and the type data TYPE in the example of FIG. 4D indicates that the associated unit waveform is a "release portion waveform including a loop waveform segment LW and a non-loop waveform segment NLW". The type data TYPE includes other information capable of indicating the waveform type in any one of several manners corresponding to the above-mentioned waveform types. Identification data ID is for identifying each individual waveform data; the identification data ID may, for example, be a file name of the waveform data.

Further, the management data includes address data and other data that are necessary for reading out the waveform data of the unit waveform in question from the waveform data area. In the example of FIG. 4B, the management data includes a start address SA, a loop start address LS, loop length data LL, number-of-waves data WN, initial phase information SP, initial phase information SP of the loop waveform, etc. In the example of FIG. 4C, the management data includes a loop start address LS, loop length data LL, number-of-waves data WN, initial phase information SP of the loop waveform, etc. Further, in the example of FIG. 4D, the management data includes a loop start address LS, loop length data LL, number-of-waves data WN, initial phase information SP of the loop waveform, end address EA, etc.

For each of the loop waveforms LW, the number of addresses (samples) per wave, i.e., per cycle of the waveform, can be identified from a combination of the loop length data LL and number-of-waves data WN. The data indicative of the number of addresses (samples) per cycle of the waveform will hereinafter be called wavelength data WL. The wavelength data WL can be obtained by following Equation (1):

$$WL=LL/WN \tag{1}$$

As noted earlier, the waveform data readout at a rate according to a desired tone pitch can be done by adjusting the readout rate using these data (namely, the wavelength data WL). Because this arrangement permits control of the waveform data readout taking into account differences in the recording sampling frequencies and in original sound pitches, it is possible to readily connect or cross-fade synthesize unit waveforms of different recording sampling frequencies and original sound pitches while maintaining a desired reproduction pitch.

For the same purposes, the management data for each of the non-loop waveforms NLW too includes data (wavelength data WL) indicative of a representative or typical number of addresses (samples) per wave, i.e., per cycle of the waveform. In this case, the typical wavelength data WL can generally be obtained using a mathematical expression of "(recording sampling frequency)÷(pitch frequency of original sound)". This kind of wavelength data WL may be contained in the management data of the unit waveform including only a non-loop waveform segment NLW; in the management data of the unit waveform including both a non-loop waveform segment NLW and a loop waveform segment LW, the wavelength data WL, obtained from Equation (1) above for the loop waveform LW, may also be applied to the non-loop waveform NLW.

The following paragraphs describe basic principles for reading out the waveform data from the waveform memory WM in accordance with a desired tone reproduction pitch.

The waveform readout principle is known, where a "frequency number" (hereinafter called an "F number"), which is a constant proportional to the desired tone reproduction pitch, is accumulated, i.e., repeatedly added to or subtracted from itself and the waveform data are sequentially read out using the integer portion of each accumulated value as a memory readout address. Assume that the present embodiment operates in accordance with this waveform readout principle. If the desired tone reproduction pitch is given as "fn" and a predetermined reproduction frequency is given as "fs", then a standard F number Fst(N) may be calculated by $$Fst(N)=fn\div fs \qquad \text{Equation (2)}$$

The standard F number Fst(N) is a decimal fraction value and is prestored in an F number table. The standard F number Fst(N) is read out from the F number table as a pitch of a tone to be reproduced is designated by a key depression operation or by information such as a note number.

The above-mentioned standard F number Fst(N) is an F number when the number of addresses corresponding to one cycle of the frequency Fn of the desired tone reproduction pitch is assumed to be "1"; that is, the standard F number Fst(N) is such a value that the F number Fst accumulated "fs/fn" times would give an accumulated value of "1". However, because the actual F number should assume a value such that accumulating the F number "fs/fn" times in cycles according to the reproduction sampling frequency fs would give the number of addresses corresponding to the wavelength data WL (the number of addresses per cycle), the actual F number, which will hereinafter be denoted by "F(N)", may be calculated as follows using the above-mentioned standard F number Fst(N) and the wavelength data WL calculated by Equation (1) above:

$$F(N)=Fst(N)\times WL \qquad \text{Equation (3)}$$

If a time-varying pitch control function (pitch vector) is used to control time variation of a pitch of a tone to be reproduced as will be later described, then the actual F number F(N) is calculated by the following equation:

$$F(N)=Fst(N)\times WL\times PV(vt) \qquad \text{Equation (4)}$$

, where PV(vt)=1.

The actual F number F(N) calculated by Equation (4) above is accumulated in regular cycles according to the reproduction sampling frequency fs, and the waveform data are read out sequentially using the integer portion of each accumulated value as the read address (relative address to the start address SA or LS). In this way, the reproductive readout can be carried out while controlling the pitch variation, over time, of the waveform having the frequency fn corresponding to the desired tone reproduction pitch. The read address "AD" for reading the waveform data of the loop waveform LW can be expressed as $$AD=LS+MOD.LL\{\Sigma F(N)\} \qquad \text{Equation (5)}$$

, where "ΣF(N)" represents a value obtained by accumulating the F number F(N) in regular cycles according to the reproduction sampling frequency fs, and "MOD.LL{ΣF(N)}" represents a remainder from division of the accumulated value ΣF(N) when a value corresponding to the loop length data LL of the loop waveform LW is used as a modulo, i.e., a remainder of a quotient obtained by dividing the value ΣF(N) by the loop length LL. In this manner, the read addresses AD repeated (i.e., looped) within an address range determined by the loop length data LL are generated, so that the waveform data of the loop waveform LW can be read out in a repeated or looped fashion in accordance with the read addresses AD.

To read out a non-loop waveform segment NLW of an attack portion waveform as in the example of FIG. 2A, it is only necessary to calculate a read address AD in accordance with the following Equation (6) and read out the non-loop waveform segment NLW only once in accordance with the thus-calculated address AD:

$$AD=SA+\Sigma F(N) \qquad (6)$$

Similarly, to read out a non-loop waveform segment NLW of a release portion waveform like the one shown in FIG. 2C, it is only necessary to calculate a read address AD in accordance with the following Equation (7) and read out the non-loop waveform segment NLW only once in accordance with the thus-calculated address AD:

$$AD=LS+LL+\times F(N) \qquad (7)$$

, where "LS+LL" represents the start address of the non-loop waveform segment NLW in the release portion waveform.

Waveform data having higher resolution than that of the prestored waveform data can be generated, by using the decimal fraction of the accumulated value ΣF(N) of the F number F(N) to carry out interpolating arithmetic operations between samples values of the waveform data as conventionally known in the art. In calculating the F number F(N) using Equation (4) above, or during the course of calculation of the accumulated value ΣF(N), a lower bit has to be rounded because of a limit to the number of the bits (figures) capable of being arithmetically operated. The rounding operation would unavoidably result in an error, which, however, can be compensated for by executing predetermined error-correcting arithmetic operations in appropriate cycles. Particularly, when two loop waveforms are to be cross-fade synthesized, the described embodiment, as will be later described in detail, generates the read addresses AD of the two loop waveforms while maintaining a phase difference corresponding to a difference between the initial phases of the loop waveforms, to thereby allow two resultant loop-reproduced waveforms to be matched in phase. Thus, the above-mentioned rounding error would result in an error in the phase difference between the read addresses AD of the two loop waveforms, thereby resulting in an error in the phase matching between the loop-reproduced waveforms. In order to compensate for the rounding error that would upset the predetermined phase difference between the read addresses AD during the cross-fade synthesis, the error-correcting arithmetic operations may be executed compulsorily in appropriate cycles such that the predetermined phase difference between the read addresses AD can be properly maintained. For example, to keep constant the difference between the initial phases, the accumulated value ΣF(N) may be modified at predetermined time intervals, e.g., once for reproduction of every 512 samples of the waveform data (every 10 ms in the case where the reproduction sampling frequency fs is 48 kHz) or once for reproduction of every 4,096 samples of the waveform data (every 100 ms in the case where the reproduction sampling frequency fs is 48 kHz).

Next, a description will be made about basic examples of the processing for connecting together loop waveforms in accordance with the present invention.

Figure 5A:
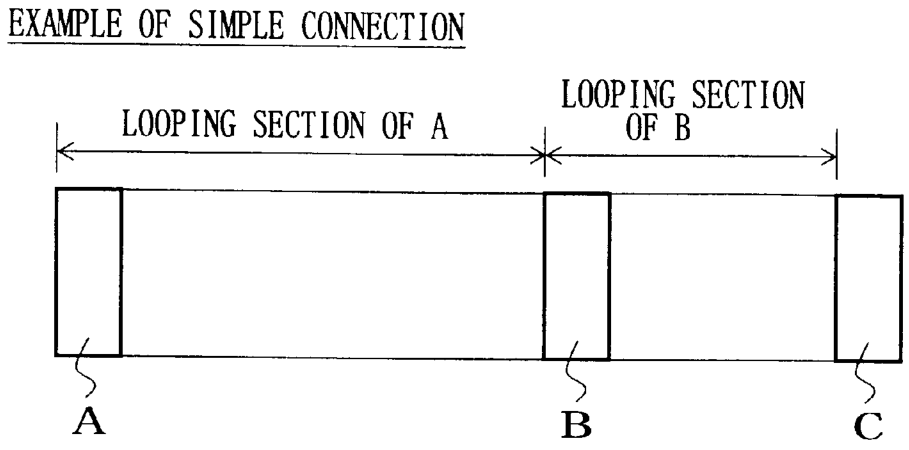
FIGS. 5A and 5B are diagrams showing examples of simple connection and cross-fade synthesis between the loop waveforms.

FIG. 5A shows an example where a pair of preceding and succeeding loop waveforms A and B are simply connected with each other ("Simple Connection"). In this case, the two waveforms A and B are connected together by switching readout such that the preceding loop waveform A is first read out a predetermined number of times in a looped fashion and then the succeeding loop waveform B is read out a predetermined number of times in a looped fashion. In this case, it is only necessary that the readout start address of the succeeding loop waveform B be adjusted, taking the respective initial phase information SP of the two loop waveforms into account, in such a way that the end of the preceding loop waveform A and the beginning of the succeeding loop waveform B are placed in phase with each other. Assuming that the preceding loop waveform A is the example 2 loop waveform of FIG. 3B and the succeeding loop waveform B is the example 3 loop waveform of FIG. 3C, it is sufficient that, once the read address of the preceding loop waveform A has reached the zero phase address ZP at the end of the looped readout, the readout operation be shifted to the succeeding loop waveform B so that the succeeding loop waveform B starts being read out at its zero phase address ZP. Thus, even in this simple connection, appropriate phase adjustment can be carried out so that a smooth connection is achieved between the two loop waveforms by use of the respective initial phase information SP of the loop waveforms. Further, in this case, the sustain times of the respective loop-reproduced waveforms, i.e., the sections where the waveforms are looped ("looping sections"), can be variably controlled in accordance with respective unique time control information of the waveforms.

Figure 5B:
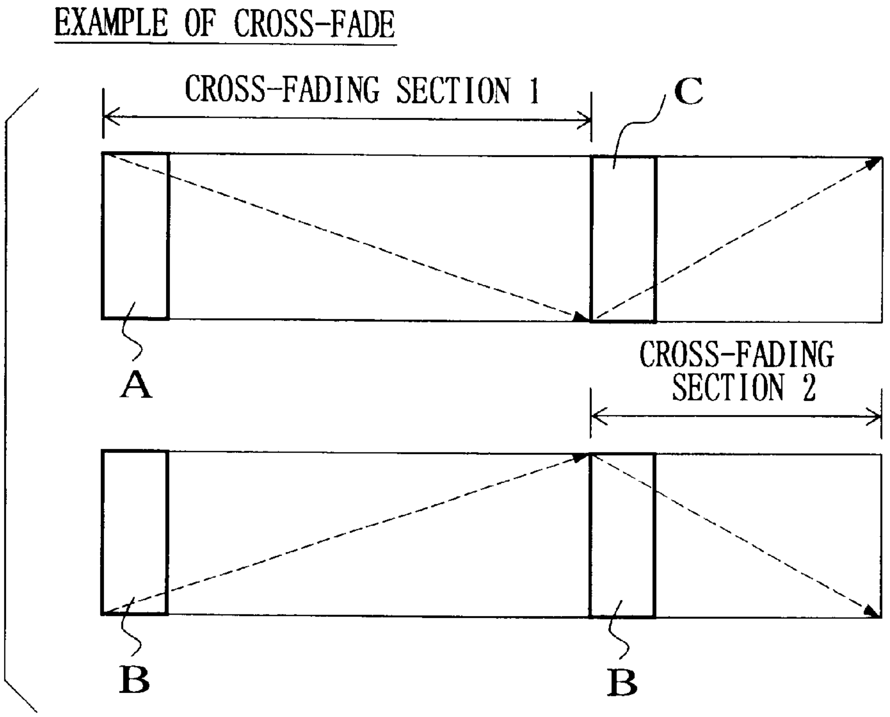

FIG. 5B shows an example where a pair of preceding and succeeding loop waveforms A and B are synthesized with each other by cross-fade connection ("Cross-fade Synthesis"). Here, in cross-fading section 1, the preceding loop waveform A is read out in a looped fashion, and simultaneously the succeeding loop waveform B is also read out in a looped fashion. Then, the amplitude of the loop-reproduced waveform corresponding to the preceding loop waveform A is controlled by an envelope having a fade-out (falling) characteristic as depicted by a descending dotted line in the figure and the amplitude of the loop-reproduced waveform corresponding to the succeeding loop waveform B is controlled by an envelope having a fade-in (rising) characteristic as depicted by an ascending dotted line in the figure, so that the resultant amplitude-controlled waveforms are additively synthesized to produce a single loop-reproduced waveform. The loop-reproduced waveform thus produced by the cross-fade synthesis will present a smooth change from the loop waveform segment A to the other loop waveform segment B. In next cross-fading section 2, the loop waveform B is read out in a looped fashion and simultaneously a next loop waveform C is also read out in a looped fashion, so that the two loop waveforms B and C are cross-fade synthesized in a similar manner to the above-mentioned. In this case too, the sustain times of the respective loop-reproduced waveforms in each of the cross-fading sections can be variably controlled in accordance with respective unique time control information of the waveforms. The time lengths of the individual cross-fading sections can be variably controlled independently of each other by, for example, varying the inclinations of the cross-fading curves (i.e., the inclinations of the fade-out and fade-in envelopes) in accordance with the respective time control information. Assume that the cross-fade synthesis is also used to connect loop waveforms in other cases to be described later.

Connecting two loop waveforms by cross-fade synthesis with the respective phases of the waveforms left unmatched is not preferable in that the waveforms will cancel each other out. For this reason, there arises a need for appropriate phase adjustment to achieve phase matching between the read-out data (i.e., loop-reproduced waveforms) of the two loop waveforms to be cross-fade synthesized. To this end, the phases of the two loop-reproduced waveforms are controlled to be matched with each other, by using the respective initial phase to appropriately phase-adjusting their respective read addresses AD. Note that the terms "phase matching", "matching between the phases" and the like do not necessarily mean exact phase matching; rather, it means "relatively loose phase matching" which includes appropriately adjusting the phases only to the extent that the unwanted cancelling out of the waveforms is avoided.

As an example, the read address ADi and $ADi_{-1}$ of the two loop waveforms to be cross-fade synthesized may be calculated by Equation (8) and Equation (9) below, where variables "AD", "LS", "LL" and "ΣF(N)" are similar to those in Equation (5) above, and the subscript "$i_{-1}$" attached to each of the variables indicates that the variable in question is one for a preceding loop waveform while the subscript "i" attached to each of the variables indicates that the variable in question is one relating to the succeeding loop waveform. Namely, "$ADi_{-1}$" represents the read address of the preceding loop waveform, and "ADi" represents the read address of the succeeding loop waveform. "$SPi_{-1}$" represents the initial phase information SP (radian representation) of the preceding loop waveform, and "SPi" represents the initial phase information SP (radian representation) of the succeeding loop waveform. In this example, Equation (8) is the same as Equation (5), and no address offset process corresponding to the initial phase information SP is performed on the read address $ADi_{-1}$ of the preceding loop waveform.

$$ADi_{-1}=LSi_{-1}+MOD.LLi_{-1}\{\Sigma Fi_{-1}(N)\} \quad \text{Equation (8)}$$

$$ADi=LSi+MOD.LLi\{\Sigma Fi(N)-(SPi-SPi_{-1})\times WLi/2\pi\} \quad \text{Equation (9)}$$

In Equation (9) above, the term "$-(SPi-SPi_{-1})\times WLi/2\pi\}$" represents a difference between the initial phases $SPi_{-1}$ and SPi in the number of addresses using the waveform data WLi of the succeeding loop waveform as one period (=2π). Thus, the read address ADi of one of the two loop waveforms is offset relative to the read address $ADi_{-1}$ by the number of addresses corresponding to the difference between their respective initial phases SP ("$SPi-SPi_{-1}$"), so that the actual phases of the read-out waveforms can be appropriately matched with each other. Namely, when the waveform data is to be read out from an address "0" of the initial phase $SPi_{-1}$ in accordance with the read address $ADi_{-1}$, the other read address ADi is offset from the initial phase SPi, by the amount corresponding to the phase difference "$SPi-SPi_{-1}$", to correspond to the phase "$SPi-(SPi-SPi_{-1})$" ($=SPi_{-1}$), so that the waveform data is read out from the offset address and thus the waveform data of the two waveforms will be matched with each other in absolute phase.

Figure 6:
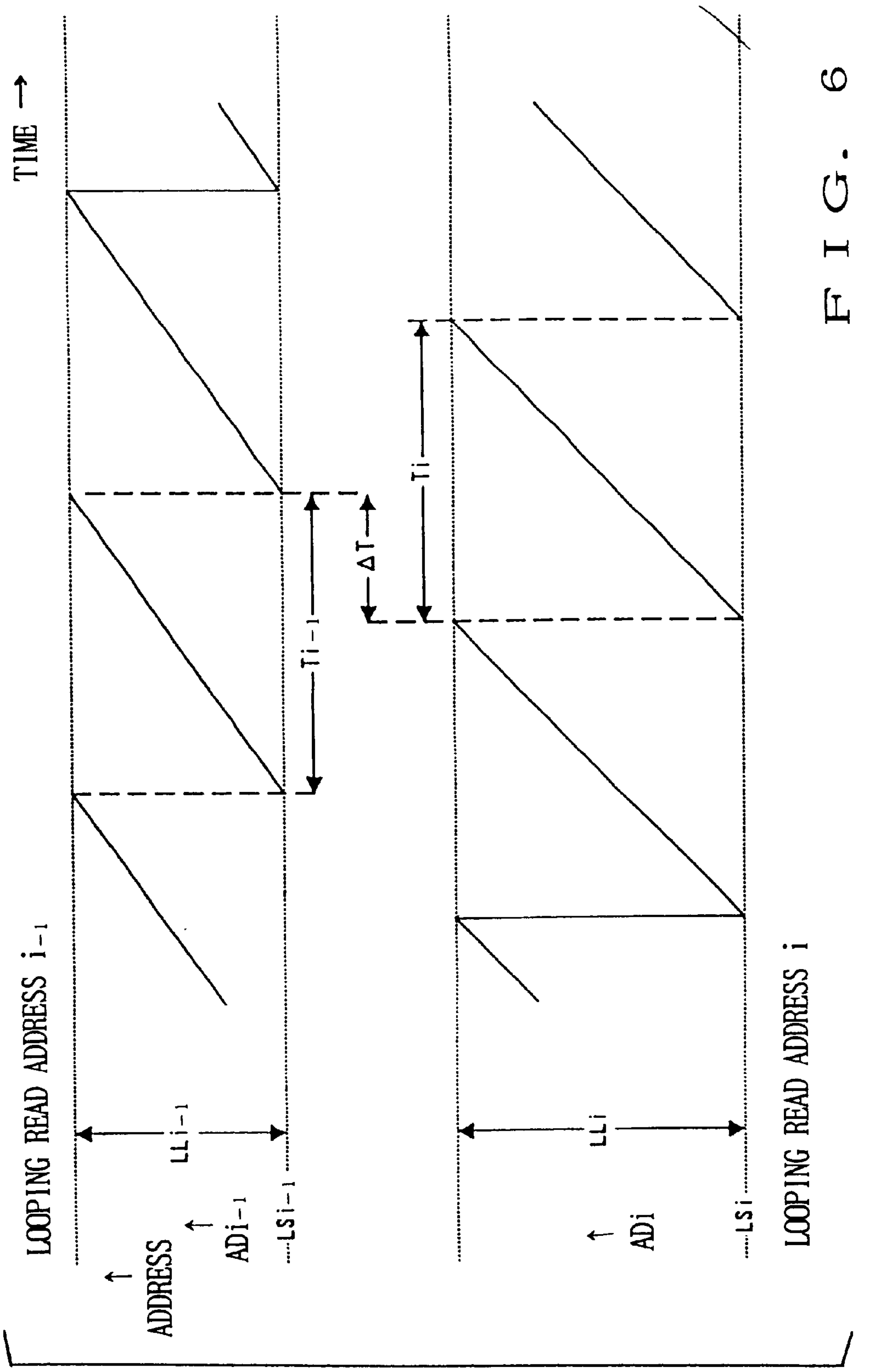
FIG. 6 is a diagram showing a manner in which two read addresses for reading out two loop waveforms to be cross-fade synthesized are controlled to loop while being kept offset relative to each other in accordance with a difference between their respective initial phases.

FIG. 6 is a diagram showing a manner in which the above-mentioned two read addresses $ADi_{-1}$ and ADi is caused to loop while being kept offset relative to each other by the number of addresses corresponding to the difference between their respective initial phases ("$SPi-SPi_{-1}$"), where the vertical axis represents the address while the horizontal axis represents the time. The two read addresses $ADi_{-1}$ and ADi loop within address ranges corresponding the respective loop length data $LLi_{-1}$ and LLi. As clearly seen from the figure, a read address forming process in the described embodiment comprises looping a first address signal ADi for reading out the waveform data of a first loop waveform and a second address signal $ADi_{-1}$ for reading out the waveform data of a second loop waveform in different manners corresponding to the difference between the respective initial phases ("$SPi-SPi_{-1}$") of the first and second loop waveforms. This way, as the waveform data of the first and second loop waveforms are read out repeatedly in accordance with the first and second address signals ADi and $ADi_{-1}$, respectively, the phases of first and second loop-reproduced waveforms, corresponding to the first and second loop waveforms, are adjusted or matched with each other. Note that the illustrated example of FIG. 6 assumes that the number of loop waves in each of the two loop waveforms is "1" and the respective loop periods of the waveforms $Ti_{-1}$, and Ti each correspond to one period T of the reproduction pitch. Thus, a time difference ΔT between the loop timing of the address signals $ADi_{-1}$ and ADi can be expressed in a radian representation of $2\pi(\Delta T/T)$, which corresponds to the difference between the initial phases ($SPi-SPi_{-1}=\Delta SP$) of the two loop waveforms. Namely, the following relationship is established:

$$\Delta SP=SPi-SPi_{-1}=2\pi(\Delta T/T)$$

As shown in the figure, the individual address signals $ADi_{-1}$ and ADi are caused to loop while maintaining an address deviation corresponding to the initial phase difference ΔSP.

At a point where there occurs a shift between the cross-fading sections, the loop waveform having been used so far as the succeeding loop waveform becomes a new preceding loop waveform and a next loop waveform becomes a new succeeding loop waveform. To smooth the advance of the read address ADi switched from the succeeding loop waveform to the new preceding loop waveform, the waveforms may be switched at a point when the read address ADi has reached the end address (namely, "loop start address LS"+"loop length data LL") of the loop waveform at the end of the cross-fading section. By so doing, the value to be next taken by the read address ADi of the succeeding loop waveform, having been looping while maintaining the address offset in accordance with Equation (9), equals that of the loop start address LS; thus, even when the shift in the cross-fading section causes the succeeding loop waveform to change to the new preceding loop waveform in a next sampling period and the read address $ADi_{-1}$ of the waveform is calculated in accordance with Equation (8) above, the predetermined loop start address LS can be designated as the read address, so that appropriate control is permitted.

The mathematical expressions to calculate the two read addresses $ADi_{-1}$ for the cross-fade synthesis may be any other suitable expressions than Equation (8) and Equation (9) above. For example, Equation (8) and Equation (9) may each be modified to provide an offset corresponding to the number of addresses that in turn corresponds to the initial phase $SPi_{-1}$ or SPi as follows:

$$ADi_{-1}=LSi_{-1}+MOD.LLi_{-1}\{\Sigma Fi_{-1}(N)\}-SPi_{-1}\times WLi_{-1}/2\pi\}. \quad \text{Equation (10)}$$

$$ADi=LSi+MOD.LLi\{\Sigma Fi(N)-SPi_{-1}\times WLi/2\pi\} \quad \text{Equation (11)}$$

In this case too, a time difference between the loop timing of the two addresses $ADi_{-1}$ and ADi corresponds to the difference between the initial phases ($SPi-SPi_{-1}=\Delta SP$) of the two loop waveforms., so that the actual readout phases of the waveforms can be matched with each other.

The preceding paragraphs have described the processing which is arranged to substantially match absolute phases of loop-reproduced waveforms, generated from two loop waveforms having different initial phases, by setting a time difference between loop timing of read addresses $ADi_{-1}$ and ADi taking an initial phase difference ("$SPi-SPi_{-1}$") into account and thereby controlling loop readout of the waveforms. Such processing is applicable not only to the cross-fade synthesis case but also to another case where two or mote loop waveforms are combined together, such as by mixing synthesis or interpolation synthesis, at a desired mixing ratio. Further, the initial phase information SP need not necessarily be prestored in the management data area; that is, a difference between given initial phases of two loop waveforms to be synthesized may be determined, by analyzing the two loop waveforms, only at the time of actually performing the synthesis so that the absolute phases of the loop-reproduced waveforms, generated on the basis of readout of the two loop waveforms of different initial phases, can be substantially matched by shifting the loop timing of their respective read addresses from each other in accordance with the thus-determined initial phase difference. The analysis of the phase difference can be done, for example, by finding a phase difference that maximizes a correlation function between the two loop waveforms.

Now, a detailed description will be made about the processing for forming a waveform of a continuing sound.

Figure 4E:
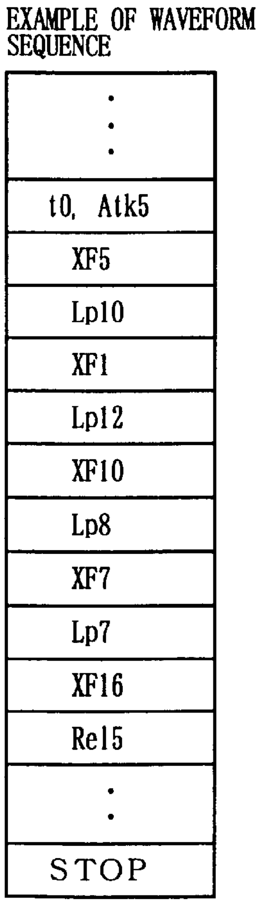

In principle, a waveform of a continuing sound can be formed by selecting a plurality of unit waveforms in a desired order, sequentially reading out the waveform data of the selected unit waveforms from the waveform memory WM, and connecting together the thus-read out waveform data. As an example, the order in which the unit waveforms are to be selected and the waveform data are to be read read out from the waveform memory WM is designated by preset waveform sequence data. FIG. 4E shows an example of such preset waveform sequence data, which may be prestored in any one of the ROM 101, RAM 102, hard disk device 103, removable disk device 104, etc. and may be subjected to an editing operation, such as rewriting of the data contents, as necessary.

The waveform sequence data shown in FIG. 4E correspond to the case where a plurality of unit waveforms are combined together in the manner as shown in FIG. 7A. In FIG. 4E, there is stored waveform selection data designating a particular unit waveform Atk5 along with time data t0; the time data to is indicative of timing to start the waveform formation. The management data of the unit waveform with "Atk5" identification ID is read out from the waveform memory WM using, as an index, the value "Atk5" designated by the waveform selection data, and the waveform data of the unit waveform Atk5 are read out in the predetermined sequence. For example, this unit waveform Atk5 is an attack portion waveform including a non-loop waveform segment NLM and a loop waveform segment LW as shown in FIG. 2A. The next data XF5 set in the waveform sequence data is indicative of a time length of a particular cross-fading section; the cross-fading section corresponds to the inclination of the cross-fade curve. Namely, the cross-fade curve is a function that linearly varies within a range from a minimum coefficient value "0" to a maximum coefficient value "1" (or from "1" to "0"), and its inclination corresponds directly to a total time necessary for the "1" to "0" (or "1" to "0") variation, i.e., the cross-fading section length. The following data Lp10 is waveform selection data designating a particular unit waveform Lp10 including only a loop waveform segment. Therefore, the above-mentioned data XF5 indicates a cross-fading section length where the loop waveform segment located at the end of the unit waveform Atk5 is cross-fade synthesized with the following loop waveform Lp10.

Figure 7:
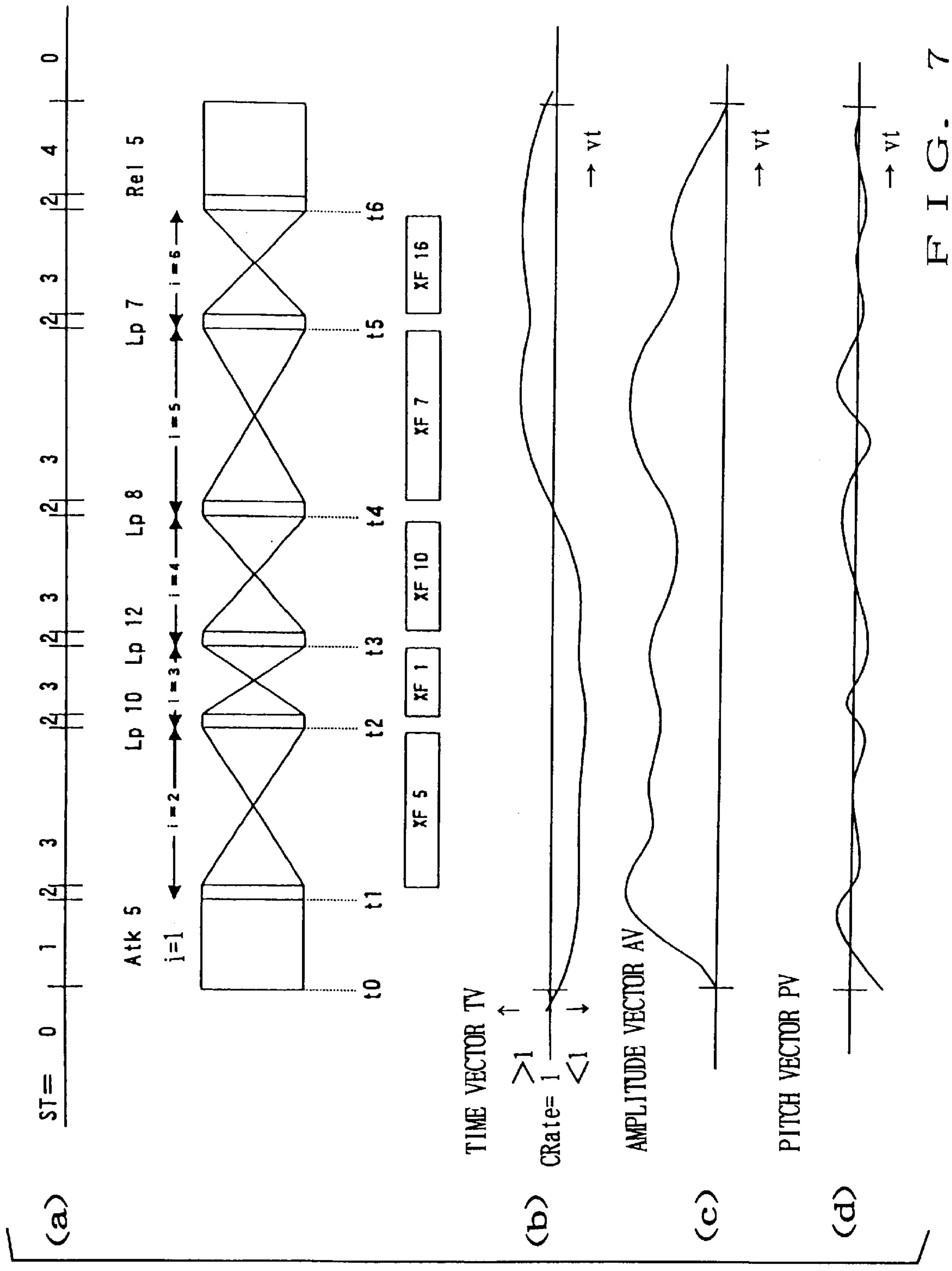
FIG. 7 is a conceptual diagram showing examples of the waveform sequence and vector data for controlling tonal factors corresponding to the waveform sequence.

FIG. 7 shows how subsequent unit waveforms Lp12, Lp8 and Lp7 are sequentially connected with the respective cross-fading section lengths sequentially set as depicted at XF1, XF10, XF7 and XF16. Thus, the data of FIG. 4E are also stored, in this case, to provide a corresponding sequence. Last unit waveform Re15 in FIG. 7 is a release portion waveform including a loop waveform segment LW and a non-loop waveform segment NLW as shown in FIG. 2C. In the cross-fading section whose length is designated by the data XF16, cross-fade synthesis is performed between the loop waveform segment Lp7 and the loop waveform segment located at the beginning of the release portion waveform Re15.

In part (a) of FIG. 7, times t1–t6 each represent a point when switching is to be made between the unit waveforms to be used. These switching points depend on the respective cross-fading section lengths designated by particular data lengths of the non-loop waveform and the data XF, but they are variably controlled, as necessary, in accordance with later-described time-axial stretch/compression control of the waveform data. Ordinal number "i" is indicative of a step for switching between the unit waveforms in the waveform sequence and changes sequentially, for example, in ascending order of "1", "2", "3", . . . . Further, state information ST shown in part (a) of FIG. 7 is sequence management information that changes in accordance with progression of the waveform sequence. For example, the state information ST at a value "0" indicates a sound-generation stop state, the state information ST at a value "1" indicates an attack state, the state information ST at a value "2" indicates a transitional state where arrangements are made for switching between the unit waveforms, the state information ST at a value "3" indicates a cross-fade state where cross-fade synthesis is performed between loop waveforms, and the state information ST at a value "4" indicates a release state.

In accordance with the waveform sequence as described above, predetermined unit waveforms are sequentially read out, during which time each loop waveform segment is read out in a looped fashion and smooth connection between the unit waveforms is permitted through cross-fade synthesis between the loop waveform segments, so that a waveform of a continuing sound can be formed as a whole. The "continuing sound" may comprise a plurality of sounds or notes (i.e., a phrase) rather than a single sound or note. In this case, for cross-fade synthesis between the loop waveforms, the loop readout is carried out while performing phase matching by use of their respective initial phase information SP. Note that the waveform sequence data for forming a waveform of a desired continuing sound may be generated or changed in real time in response to a human player's selecting/setting operation, rather than being prestored in memory.

Further, according to the described embodiment of the invention, various tonal factors of the waveform generated in accordance with the above-described waveform sequence may be variably controlled by a variety of parameters. Typical examples of the tonal factors to be thus variably controlled are the pitch, color, amplitude, time, etc. of tones. Respective control amounts of the individual tonal factors are designated by time-variable envelope data. Parts (b)–(d) of FIG. 7 show examples of some of the tonal factor control data. More specifically, part (b) shows an example of the time-factor control data (time control information), part (c) shows an example of the amplitude-factor control data, and part (d) shows an example of the pitch-factor control data. Respective time-varying patterns, i.e., envelope shapes, of these control data may be arranged as templates in advance, or desired templates of the time-varying patterns may be created as desired by the user. Further, these templates may either be prestored in a suitable memory or table, or be made via arithmetic operations.

Further, in the described embodiment, such data designating predetermined templates of these tonal-factor control data are arranged previously, as vector data, in corresponding relation to various waveform sequences. The vector data specifying time-factor control data (time control information) as shown in part (b) of FIG. 7 will hereinafter be called a time vector TV; with this time vector TV, a template of the time-factor control data (time control information) in the form of a predetermined envelope (i.e., variable over time) can be specified to generate the time envelope. Further, the vector data specifying amplitude-factor control data as shown in part (c) of FIG. 7 will hereinafter be called an amplitude vector AV; with this amplitude vector AV, a template of a predetermined amplitude envelope can be specified to generate the amplitude envelope. Similarly, the vector data specifying pitch-factor control data as shown in part (d) of FIG. 7 will hereinafter be called a pitch vector PV; with this pitch vector PV, a template of a predetermined pitch variation envelope can be specified to generate the pitch variation envelope. The pitch variation envelope values based on the pitch vector PV are expressed in ratios to the F number; the pitch variation envelope value is "1" when the pitch is not to be varied, greater than "1" when the pitch is to be raised, and smaller than "1" when the pitch is to be lowered.

The time factor control performed on the basis of the time vector TV is directed to stretching or compressing the length (i.e., duration) of the waveform data along the time axis, and this time factor control will hereinafter be called "time-axial stretch/compression control" and sometimes abbreviated "TSC control". It is desirable that such time-axial stretch/compression control or TSC control be able to control the time-axial length of the waveform data independently of the tone reproduction pitch. Time-axial stretch/compression information based on the time vector TV, to be used for the TSC control in the described embodiment, is expressed as data indicative of a time-axial stretch/compression ratio (which will hereinafter be called "Crate"). For example, the time-axial stretch/compression control information is represented by a value "1" when no time-axial stretch/compression is to be performed, by a value smaller than "1" when the time-axial stretch is to be performed, and by a value greater than "1" when the time-axial compression is to be performed.

The time-axial stretch/compression control, i.e., TSC control, will be described more fully below. For the loop waveform, the time length of the entire loop-reproduced waveform can, in principle, be variably controlled independently of the tone reproduction pitch relatively easily, by varying the number of readout loops to be effected. Namely, as an inclinationn of a particular cross-fade curve is specified by the cross-fading section length data XF, a cross-fading section length (time length or number of readout loops) is determined. By variably controlling the inclination of the specified cross-fade curve in accordance with a time-axial stretch/compression ratio indicated by the time vector TV, the cross-fade speed is variably controlled so that the time length of the cross-fading section can be variably controlled.

For the non-loop waveform, on the other hand, it is not so easy to variably control the time-axial length or duration of the waveform independently of the tone reproduction pitch. However, the time-axial stretch/compression control of the non-loop waveform can be performed with ease by employing a novel technique for "time-axial stretch/compression control of waveform data" that has already been proposed in other patent applications by the assignee of the present application. Stated briefly, the proposed time-axial stretch/compression control technique is characterized in that to compress the time-axial length of the non-loop waveform composed of a given quantity of waveform data, the waveform data are read out with appropriately selected ones of the data skipped, while to stretch the time-axial length of the non-loop waveform, the waveform data are read out with appropriately selected ones of the data repeated. The proposed novel time-axial stretch/compression control technique also subjects the read-out waveform data to cross-fade synthesis, in order to eliminate undesirable discontinuousness resulting from the skip or repetition of some of the waveform data. Although not fully explained here, such a novel approach may also be applied to the TSC control of the non-loop waveform in the described embodiment. In one alternative, the time-axial stretch/compression control may be performed only on the loop waveform without being applied to the non-loop waveform.

The horizontal axis in parts (b)–(d) represents the time axis; however, the time axis does not represents the axis of actual times, but is the one having been subjected to the stretch/compression controlled in accordance with the time-axial stretch/compression ratio data Crate based on the time vector TV as shown in part (b) of FIG. 7; this time axis will also be called a virtual time vt. More specifically, because loop-reproduced waveform data, such as the one shown in part (a) of FIG. 7, is controlled to be stretched or compressed in its time axial length in accordance with the time vector TV shown in part (b) of FIG. 7, it is also necessary to stretch or compress the time axes of the control data based on the vectors shown in parts (b)–(d) of FIG. 7. This is because the respective time axial lengths or duration of the individual tonal-factor control data also have to be stretched or compressed in synchronism with the time-axial stretch/compression of the loop-reproduced waveform data. For this reason, the described embodiment uses the virtual time vt as a time variable of the pitch control function PV(vt) in Equation (4) above. The virtual time vt is also used as a time variable of an amplitude envelope function AV(vt) and pitch variation envelope function PV(vt).

Next, a description will be made about an example of a program for execution by the computer of FIG. 1 performing the waveform forming processing in accordance with the waveform sequence as shown in FIG. 4E or in part (a) of FIG. 7, with reference to FIGS. 8 to 10.

Figure 8:
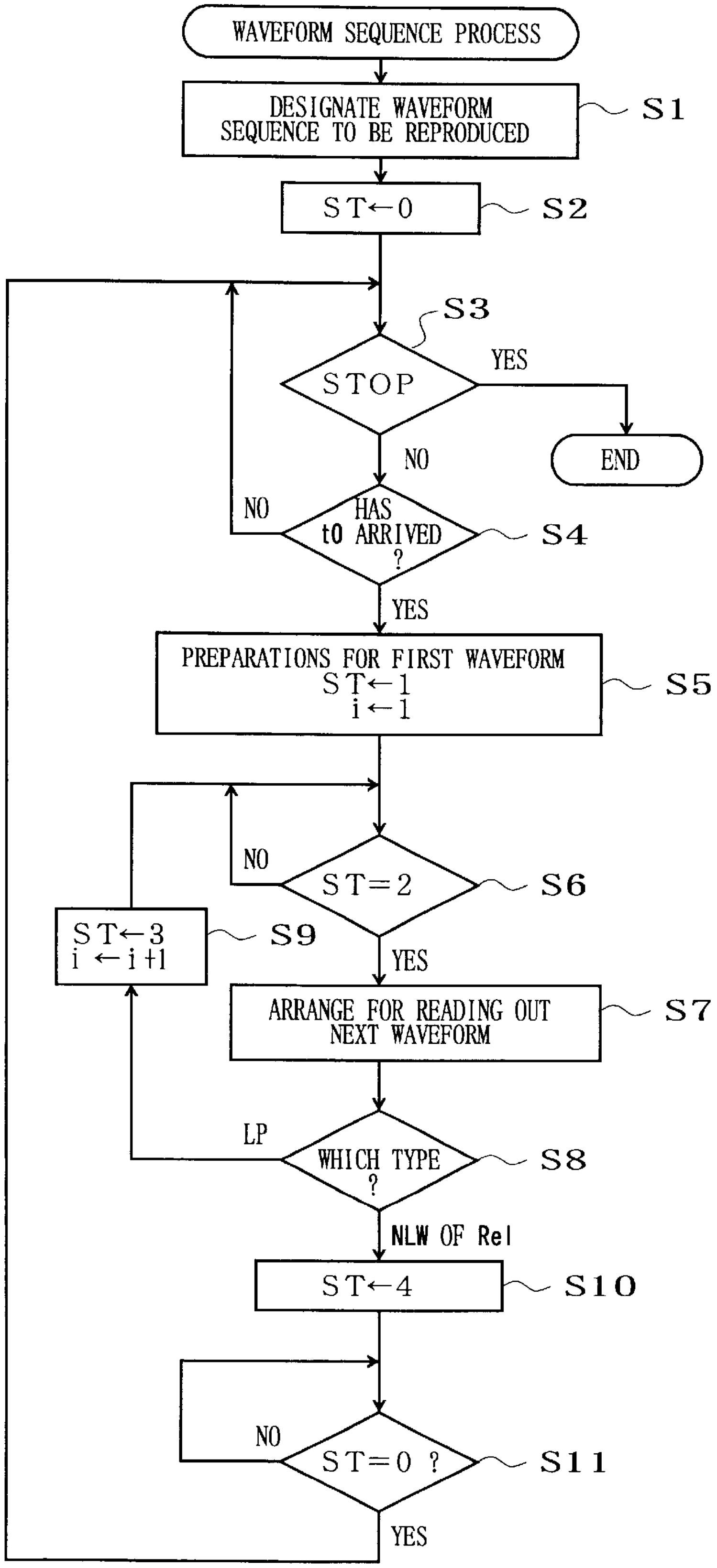
FIG. 8 is a flow chart showing an example of a waveform sequence process.

FIG. 8 is a flow chart outlining a process for advancing a waveform sequence to reproduce a waveform ("Waveform Sequence Process"). First, particular waveform sequence data to be reproduced is designated at step S1. Then, at step S2, the state information ST is set to the value "0" and preparations are made for initiating waveform reproduction. At following step S3, it is checked whether there is a stop event STOP. If there is no such stop event STOP as determined at step S3, it is further ascertained at step S4 whether waveform formation timing indicated by time data t0 has arrived or not. With a negative (NO) answer, the program reverts to step S3 to repeat the operations of steps S3 and S4. Once the waveform formation timing has arrived and hence an affirmative (YES) answer has been given at step S4, the state information ST is set to "1" and also the ordinal number i is set to "1", so that preparations are made for reproducing a first unit waveform, i.e., an attack portion waveform, at step S5. Namely, at step S5, the management data of the attack portion waveform in question (e.g., the waveform Atk5 of FIG. 4E or part (a) of FIG. 7) are read out from the waveform memory WM, so as to make preparations for starting the readout of the waveform data of the attack portion waveform Atk5 from the waveform data area of the waveform memory WM. Then, at step S6, it is checked whether the state information ST has become "2". With a negative answer, the program waits until the information ST becomes "2".

Figure 9:
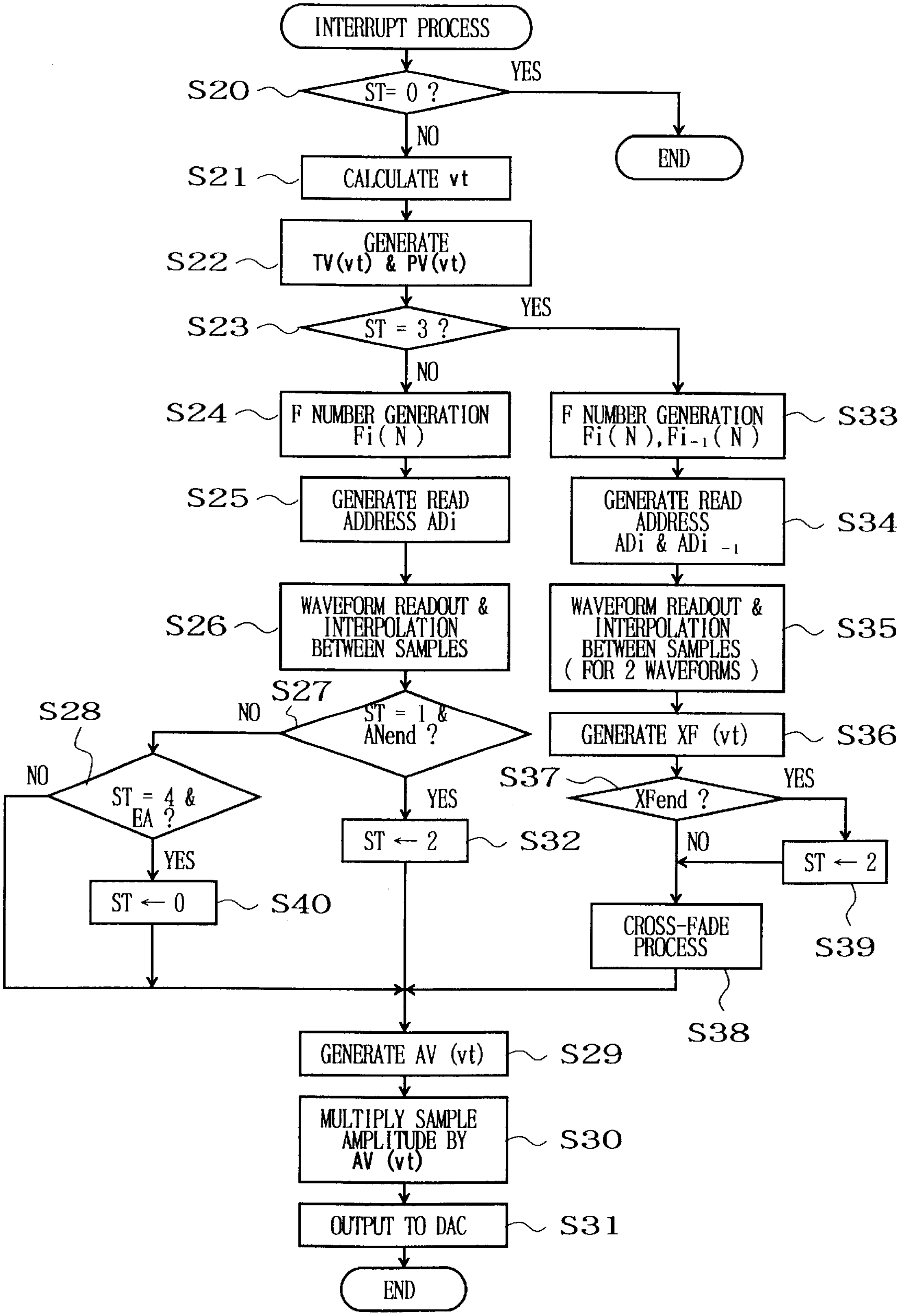
FIG. 9 is a flow chart showing an example of a waveform sample data forming process carried out as an interrupt process in the preferred embodiment of the invention.

FIG. 9 is a flow chart outlining an interrupt process performed periodically every cycle of the reproduction sampling frequency fs. Waveform data readout and waveform formation per sample are carried out in this interrupt process. Therefore, while the waveform sequence process is in the wait state at step S6, the interrupt process of FIG. 9 is executed repeatedly so as to perform the waveform data readout and waveform formation. In this interrupt process, it is first checked at step S20 whether or not the state information ST is at the value "0". If so, the interrupt process is terminated immediately. If the state information ST is not at the value "0" as determined at step S20, the program goes to next step S21 in order to calculate a virtual time vt. The virtual time vt is calculated by accumulating a current value of time-axial stretch/compression ratio data Crate designated by a time vector TV. Then, the program proceeds to step S22, in order to generate time-axial stretch/compression control data, based on a template corresponding to the time vector TV, which is equal to a new value of the ratio data Crate (this data TV(vt) will hereinafter be simply called a "time vector value TV(vt)". Step S22 also generates a current value of a pitch variation envelope function, based on a template corresponding to a pitch vector (this value PV(vt) will hereinafter be simply called a "pitch vector value PV(vt)". Namely, using the currently determined value of the virtual time vt as a time variable, instantaneous values of the time-axial stretch/compression ratio data Crate and pitch variation envelope, as shown in parts (b) and (d) of FIG. 7, are read out (or arithmetically generated) at step S22.

After that, it is ascertained at step S23 whether the state information ST has become "3". If the state is not a loop waveform readout state, a negative answer is given at step S23, so that the program goes to step S24 to carry out an F number generation process. In the F number generation process, an F number F(N) for reading out a non-loop waveform is generated in accordance with Equation (4) above. More specifically, a pitch-controlled F number F(N), to be used for calculating a waveform read address, is determined on the basis of a standard F number Fst(N) corresponding to a pitch of a tone to be generated, waveform length data WL and pitch vector value PV(vt).

Then, at step S25, a read address ADi for reading out a non-loop waveform, as shown in Equation (6) or Equation (7), is generated by accumulating the F number F(N) every sampling cycle. Assume here that the generation of the read address ADi is effected in consideration of the state information ST; that is, a read address ADi for reading out a non-loop waveform NLW (non-loop waveform segment of an attack or release portion waveform) when the state ST is "1" or "4", and a read address ADi for reading out a loop waveform LW (loop waveform segment of an attack or release portion waveform) when the state ST is "2". When the time-axial stretch/compression control is performed on the non-loop waveform, this step S25 further controls the generation of the read address ADi in accordance with the time vector value TV(vt), i.e., time-axial stretch/compression ratio Crate.

Then, at step S26, the waveform data is read out from the waveform data area of the waveform memory WM on the basis of the read address ADi. At that time, interpolating arithmetic operations may be performed between the waveform samples in accordance with the decimal fraction portion of the accumulated value of the F number F(N) (i.e., decimal fraction portion of the read address ADi) as set forth above.

At next step S27, it is determined whether or not the state ST is "1" and the generated address ADi has reached an end address ANend of the non-loop waveform segment of the attack portion waveform. The end address ANend of the non-loop waveform segment NWM of the attack or release portion waveform is an address immediately preceding the loop start address LS of the attack portion waveform (i.e., "LS−1") (see FIG. 2A), and can be acquired on the basis of the loop start address LS included in the management data. If the generated address ADi has not yet reached the end address ANend of the non-loop waveform segment of the attack portion waveform, i.e., if the non-loop waveform segment being read out, a negative answer is given at step S27, so that the program branches to step S28.

At step S28, it is checked whether the state ST is "4" and the generated address ADi has reached an end address EA of the release portion waveform (see FIG. 2C). If the generated address ADi has not yet reached the end address EA of the release portion waveform, a negative answer is given at step S28, so that the program branches to step S29.

At next step S29, an amplitude vector value AV(vt) is generated in accordance with the virtual time vt. Namely, using the current value of the virtual time vt as the time variable, an instantaneous value of the amplitude envelope, based on the amplitude vector as shown in part (c) of FIG. 7, is read out or generated by an arithmetic operation. Then, the amplitude of the waveform sample data generated at step S26 is controlled in accordance with the amplitude vector value AV(vt) at step S30, and the resultant amplitude-controlled waveform sample data is passed via the bus 111 to a digital-to-analog converter (DAC) of the waveform interface 107 at step S31. When waveform data of a plurality of channels are to be formed concurrently in a parallel fashion, the above-mentioned operations of steps S20–S30 are repeated a plurality of times corresponding to these channels, and a channel synthesizing step is inserted after step S30 so as to combine the respective waveform data of the individual channels so that the combined waveform data is output at step S31.

As stated above, the interrupt process of FIG. 9 is carried out every cycle of the reproduction sampling frequency fs, to thereby generate one sample of waveform data. In this way, the non-loop waveform segment NLW and following loop waveform segment LW of the attack portion waveform which is the first unit waveform stated in the waveform sequence are read out sequentially. When the loop waveform segment LW has been completely read out once and the generated address ADi has reached the end address ANend of the non-loop waveform segment of the attack portion waveform, an affirmative answer is given at step S27, so that the program moves on to step S32 in order to set the state ST to the value "2". After that, the program goes to steps S29–S31.

Referring back to FIG. 8, once step S6 has detected that the state ST has become "2", the program proceeds to step S7 in order to make arrangements for reading out a next waveform. Namely, the content of a next step in the waveform sequence are read out (see FIG. 4E) to acquire information of the waveform data to be next read out, and necessary arrangements corresponding to the information are made, at step S7. In the illustrated example of FIG. 4E, the cross-fading section length data XF5 and subsequent waveform selection data selecting the loop waveform Lp10 are read out from a waveform sequence data memory area.

At next step S8 of FIG. 8, a determination is made as to which type of waveform a next unit waveform is. If the next unit waveform is a loop waveform, the program branches to step S9, where the state ST is set to "3" and the ordinal number i is incremented by one. After that, the program reverts to step S6 to wait until the state ST becomes "2". Note that even a release portion waveform having a loop waveform segment LW at its beginning is determined, at step S8, as a loop waveform as long as the leading loop waveform segment LW has not yet been read out, so that the program goes to step S9. In order to switch the state ST to "3" after the transitional state ST of value "2" is continued up to the loop end of the loop waveform, the state ST may be set to "3" and the ordinal number i may be incremented by one at step S9 only after confirming that the read address has reached the loop end (LS+LL).

In the interrupt process of FIG. 9, step S23 branches to an "YES" path in order to proceed to a routine for executing loop readout control starting at step S33. Namely, at step S33, an F number generation process is carried out, which is similar to but different from the F number generation process of step S24 in that an F number $Fi_{-1}(N)$ of a preceding loop waveform and an F number Fi(N) of a succeeding loop waveform are generated separately in accordance with Equation (4) above. Because the waveform length data WL (i.e., the number of addresses per wave) of the individual loop waveforms are selected as desired in the described embodiment, it is necessary that the F numbers $Fi_{-1}(N)$ and Fi(N) of the individual loop waveforms be calculated through the arithmetic operation of Equation (4) using the respective waveform length data $WLi_{-1}$ and WLi. Note that in the instance case, the preceding loop waveform is a loop waveform segment added at the end of the attack portion waveform while the succeeding loop waveform is the newly-selected loop waveform Lp10.

At next step 34, a read address generation process is carried out, which is similar to but different from the read address generation process of step S25 in that for loop readout and cross-fade synthesis, the read address $ADi_{-1}$ for the preceding loop waveform is calculated in accordance with Equation (8) above while the read address ADi for the succeeding loop waveform is calculated in accordance with Equation (9) above. At next step S35, the waveform data of the loop waveforms are read out in accordance with the read addresses $ADi_{-1}$ and ADi and also interpolation arithmetic operations are performed between the samples of the read-out waveform data.

At following step S36, a current value of the cross-fade coefficient XF(vt) is generated using the current virtual time vt as a time variable of a cross-fade function XF having an inclination characteristic determined by the cross-fading section length data XF5. For example, if the cross-fade function XF is a primary function of linear characteristic, the current value of the cross-fade coefficient XF(vt) can be obtained by multiplying the value of the virtual time vt by the value of the data XF5. Namely, when the time-axial stretch/compression ratio is "1", the virtual time vt corresponds to the actual time and is a time function that increases by one per sampling cycle, so that multiplying the virtual time vt by the data XF5 can create a primary function having an inclination corresponding to the data XF5 and the thus-created primary function can be applied as the cross-fade function XF, as expressed by $$XF(vt)=XF5\times vt+C$$

, where "C" is an arbitrary constant. As the increasing/decreasing rate (i.e., inclination) of the virtual time vt is changed by a variation of the time vector TV, the inclination of the cross-fade function XF(vt), obtained by multiplying the virtual time vt by the data XF5, also varies. This is equivalent to variably controlling the cross-fade curve, having an inclination characteristic determined by the cross-fading section length data XF5, in accordance with the current value of the time vector TV. In this way, it is possible to generate a cross-fade function XF(vt) having undergone time-axial stretch/compression control according to the time vector TV. Generally, when the cross-fade function XF is represented by an arithmetic function f(x) of a variable x or by a template tbl(x), it can be expressed as "FX=f(vt) or tbl(x)", where x=vt. More specifically, if the cross-fade function XF is a decimal fraction value varying from "0" to "1", XF(vt) is used as a fade-in cross-fade coefficient, and "1-XF(vt)" is used as a fade-out cross-fade coefficient.

Then, at step S37, a determination is made as to whether or not a predetermined cross-fade end point XFend has been reached. The cross-fade end point XFend is the end point of the cross-fading section. Namely, when the value of the cross-fade function XF(vt), i.e., the cross-fade coefficient for the fading-in (succeeding) waveform has reached a maximum value "1", this maximum value "1" is maintained thereafter. Time point when the read address ADi has reached the end address of the loop waveform (i.e., LS+LL), after arrival of the cross-fade coefficient at the maximum value "1", is determined as the cross-fade end point XFend. If the cross-fade end point XFend has not yet been reached, a negative answer is given at step S37, so that the program goes to step S38, where the read-out waveform data of the individual loop waveforms (loop-reproduced waveforms) are subjected to cross-fade synthesis in accordance with the value of the cross-fade function XF(vt). After that, the program goes to steps S29 to S31.

The interrupt process of FIG. 9 is carried out every cycle of the reproduction sampling frequency fs so that the routine of steps S33 to S38 is repeated to carry out repeated readout of the loop waveforms and cross-fade synthesis between the read-out waveform data of the loop waveforms (loop-reproduced waveforms). Then, once the cross-fade end point XFend has been reached, an affirmative answer is given at step S37, so that the program goes to step S39, where the state ST is set to "2". In this way, the cross-fade process for a single cross-fading section is completed.

Referring again to FIG. 8, once step S6 has detected that the state ST has become "2", the program proceeds to step S7 in order to make arrangements for reading out a next waveform. In the illustrated example of FIG. 4E, the cross-fading section length data XF1 and subsequent waveform selection data selecting the loop waveform Lpl2 are read out from the waveform sequence data memory area, as a sequence step following the readout of the loop waveform Lp10. Then, the loop readout process and cross-fade synthesis process, similar to the above-mentioned, are performed on difference loop waveforms. Namely, in this case, the preceding loop waveform is the loop waveform Lp10 that was the succeeding loop waveform in the preceding processing, while the succeeding loop waveform is the newly-selected loop waveform Lp12.

In this way, the loop readout process and cross-fade synthesis process are carried out while sequentially changing the loop waveforms to be processed in accordance with the predetermined waveform sequence, so that waveforms constituting segments of sounds can be formed, one after another, with smooth connections.

Then, once the cross-fading section length data XF16 and subsequent waveform selection data selecting the release portion waveform Rel are read out, at step S7 of FIG. 8, as a sequence step following the readout of the last loop waveform Lp7 (FIG. 4E), the data of the loop waveform segment LW located at the beginning of the release portion waveform Rel are acquired as information of the waveform data to be next read out and arrangements are made in accordance with the acquired data. At next step S8, the next waveform is determined as being of the loop type, so that the program branches to step S9 to set the state ST to "3". After that, the program reverts to step S6 to wait until the state ST becomes "2". This way, through the interrupt process of FIG. 9, the loop readout process and cross-fade synthesis process are performed on the last loop waveform Lp7 and the loop waveform segment LW located at the beginning of the release portion waveform Rel within the cross-fading section length corresponding to the data XF16. Upon completion of the processing for the last cross-fading section, the state ST is set to "2" at step S39 of FIG. 9.

After that, the data of the non-loop waveform segment NLW in the release portion waveform Rel are acquired as information of the waveform data to be next read out and arrangements are made in accordance with the acquired data. At next step S8, the next waveform is determined as being the non-loop waveform segment NLW of the release portion waveform Rel, so that the program goes to step S10 to set the state ST to "4". After that, the program moves on to step S11 to wait until the state ST becomes "0". On the other hand, the interrupt process of FIG. 9 branches from the negative determination of step S23 to a non-loop waveform readout routine, where, through the operations of steps S25 and S26, the addresses ADi for reading out the non-loop waveform segment NLW of the release portion waveform Rel are generated and the waveform data are sequentially read out in accordance with the generated addresses ADi and subjected to interpolating arithmetic operations between the samples. Then, when the end address EA of the release portion waveform Rel has been reached, an affirmative answer is given at step S28, so that the program goes to step S40 in order to set the state ST to "1". Thus, the sound generation is terminated. When step S11 of FIG. 8 confirms that the state ST has become "0", the program reverts step S3 to repeat the operations of steps S3 and S4. Once timing to generate a next sound in the waveform sequence has arrived, an affirmative (YES) answer is given at step S4, so that operations similar to the above-mentioned are initiated. However, the waveform sequence process of FIG. 8 is terminated as a stop event STOP occurs on the basis of the sequence data or in response to a manual operation. Namely, a waveform sequence can be built in such a way that a plurality of sounds are generated intermittently within the single waveform sequence. More specifically, not only a tone waveform corresponding to a single note but also a tone waveform corresponding to a plurality of notes (phrase) can be described by a single waveform sequence.

The preferred embodiment has been described as switching the state ST to "3" after continuing the transitional state ST (="2") up to the loop end of a loop waveform; this arrangement allows the beginning of a cross-fading section to coincide with the loop start address of a preceding loop waveform. However, the present invention is not so limited and may be modified such that the state ST is promptly switched to the value "3" at step 9 of FIG. 8 without continuing the transitional state ST (="2") up to the loop end of the loop waveform. In such a case, the cross-fading section would start at a given address of the preceding loop waveform, but it is only necessary that the initial value of the read address ADi for a succeeding loop waveform be offset by an amount corresponding to the cross-fade start address (i.e., by an amount greater than an initial offset amount corresponding to an initial phase difference).

It will be appreciated that an automatic performance of a music piece can be made by combining a plurality of the waveform sequences; to this end, there may be employed a note sequence corresponding to a stream of notes on a musical staff. The note sequence employed here may be similar to MIDI automatic sequence data; for example, notes, i.e., pitches of individual tones to be reproduced and their tone generation timing, and waveform sequences and various vectors to be used for the note generation may all be designated by event data. Alternatively, event data designating notes, waveform sequences, vectors may be designated separately in accordance with an automatic performance sequence, or other event data may be generated in accordance with the note-designating event data.

According to the present invention, the substance or contents of the individual waveform sequences, vector data TV, AV, PV corresponding to these waveform sequences, etc. can be edited freely by the user.

Figure 10A:
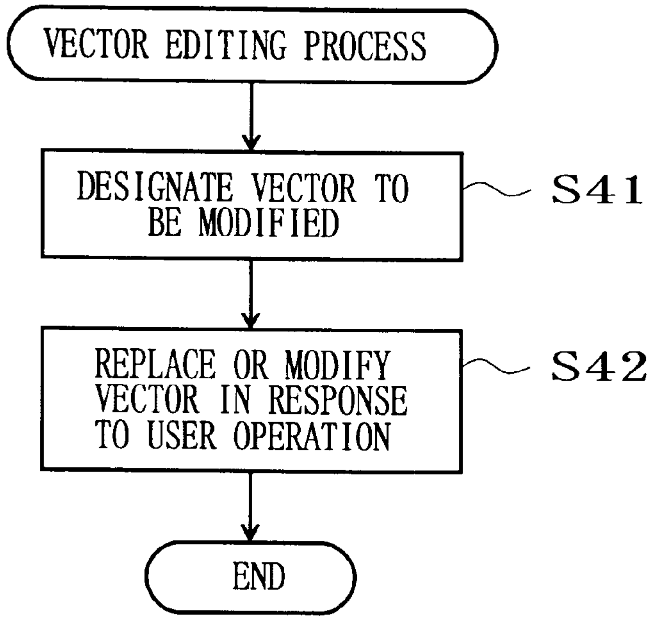
FIGS. 10A and 10B are flow charts showing examples of a vector editing process and a waveform sequence editing process.

FIG. 10A is a flow chart showing an example of a vector editing process. First, in response to a user's operation, a desired one of the waveform sequences is selected and a particular one of the tonal factors, corresponding to the selected waveform sequence, to be modified is designated at step S41. Then, in response to a user's operation, various operations are carried out at step S42, which include, for example, modifying the vector data of the designated tonal factor to provide a new template or modifying the contents of the corresponding template, i.e., specific time-varying control data designated by the vector data without modifying the vector data.

Figure 10B:
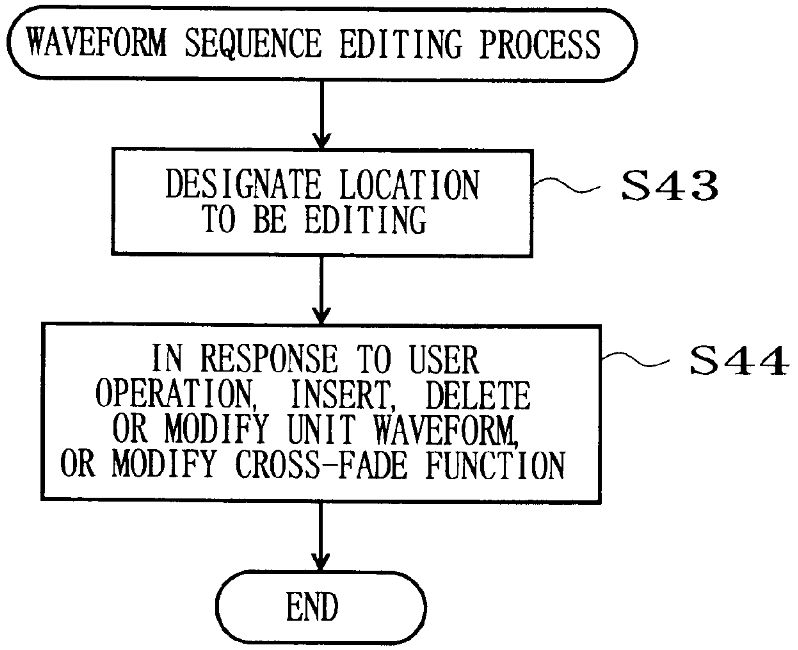

Further, FIG. 10B is a flow chart showing an example of a waveform sequence editing process. First, in response to a user's operation, a desired one of the waveform sequences is selected and a particular location of one of the uniform waveforms in the selected waveform sequence to be edited is designated at step S43. Then, in response to a user's operation, various operations are carried out at step S44, which include, for example, inserting an additional unit waveform in the designated location, deleting the unit waveform in the designated location, replacing the unit waveform in the designated location with another one, or modifying the value of the cross-fading section length data XF in the designated location.

The above-described embodiment is arranged to carry out the process for forming waveform sample data by the interrupt process of FIG. 9; that is, one sample of waveform data is formed in the interrupt process every cycle of the reproduction sampling frequency fs. However, the present invention is not so limited; as well known as the software tone generator technique proposed by the assignee of the instant application, the present invention may be arranged such that a multiplicity of samples of waveform data corresponding to a single frame section are formed collectively within a short time period and stored in an output buffer and then readout of the waveform sample data from the output buffer is executed every cycle of the reproduction sampling frequency fs. Further, the waveform formation processing of the present invention is not limited to software-based processing and may also be executed by a DSP device arranged to operate on the basis of microprograms directed to the same waveform formation processing as executed in the above-described embodiment. Alternatively, dedicated hardware circuitry may be constructed so that it performs the same waveform formation processing as in the above-described embodiment via LSI and discrete circuits.

In summary, the present invention is characterized by the provision of the memory storing not only the waveform data of a plurality of the loop waveforms but also the phase management information corresponding to the loop waveforms. Thus, the loop waveforms can be smoothly combined (connected or synthesized) with each other in a simplified manner without a need for prestoring the waveform data having been previously matched in phase. Further, even when the loop waveforms to be combined are shifted from each other in phase (particularly, in the phase of their start points), their different phases can be matched by performing phase adjustment between the loop-reproduced waveforms to be combined together, by reference to the respective phase management information. As a consequence, free waveform editing and sound making are permitted by freely combining any desired ones of the loop waveforms. In addition, the present invention can significantly reduce the burden involved in the waveform formation because it can eliminate the need for prestoring the waveform data having been previously matched in phase.

The present invention is also characterized by causing the read addresses to loop in different manners corresponding to a difference between the initial phases of first and second loop waveforms so that the phases of first and second loop-reproduced waveforms, formed as the waveform data of the first and second loop waveforms are read out repeatedly, can be adjusted to be matched with each other. Thus, with this arrangement too, the present invention allows the loop waveforms to be smoothly combined (connected or synthesized) with each other in a simplified manner without a need for prestoring the waveform data previously matched in phase. Further, even when the loop waveforms to be combined are shifted from each other in phase, their phases can be matched by the advancing deviation between the address signals. As a consequence, free waveform editing and sound making are permitted by freely combining any desired ones of the loop waveforms. In addition, the present invention can significantly reduce the burden involved in the waveform formation because it can eliminate the need for prestoring the waveform data having been previously matched in phase.

What is claimed is:

1. A waveform forming device comprising:

a storage section that stores waveform data of a plurality of loop waveforms to be read out repeatedly and also stores phase management information in corresponding relation to the loop waveform, said plurality of loop waveforms including at least two loop waveform having different phase values corresponding to their respective initial addresses, and said phase management information being information that, when a corresponding one of the loop waveforms is reproduced from said storage section and combined with another reproduced loop waveform, is used for adjusting phases of the corresponding loop waveform and the other reproduced loop to match with each other; and a waveform forming section that forms a waveform of at least part of a sound, by selecting the two loop waveforms stored in said storage section, and by repeatedly reading out the waveform data of the selected loop waveforms to thereby form at least two of reproduced loop waveforms corresponding to the selected loop waveforms and combining together the reproduced loop waveforms, wherein said waveform forming section, while reading out a first loop waveform of the at least two of the loop waveforms, reads out a second loop waveform of the at least two of the loop waveforms and thereby combines said second loop waveform with said first loop waveform, said first loop waveform being read out ahead of said second loop waveform, and wherein said waveform forming section performs phase adjustment between the reproduced loop waveforms to be combined together by using the phase management information corresponding to the selected loop waveforms to determine a readout address of said second loop waveform in such a manner that a phase of said second loop waveform matches with a current phase of said first loop waveform corresponding to readout addresses of said first loop waveform.

2. A waveform forming device as recited in claim 1 wherein each of the phase management information includes information indicative of a phase of a start point or end point of the loop waveform corresponding thereto.

3. A waveform forming device as recited in claim 2 wherein said information indicative of a phase of a start point or end point is expressed in relative phase.

4. A waveform forming device as recited in claim 1 wherein said phase management information includes information indicative of a point corresponding to a predetermined reference phase of the loop waveform.

5. A waveform forming device as recited in claim 1 wherein said waveform forming section forms a waveform of at least part of a sound by arithmetically synthesizing the reproduced loop waveforms.

6. A waveform forming device as recited in claim 1 wherein said waveform forming section forms a waveform of at least part of a sound by cross-fade synthesizing at least two of the reproduced loop waveforms generated simultaneously.

7. A waveform forming device as recited in claim 1 wherein said waveform forming section forms a waveform of at least part of a sound by connecting together the reproduced loop waveforms.

8. A waveform forming device as recited in claim 1, wherein said waveform forming section includes an address generation section for generating looping address signals for repeatedly reading out the waveform data of the selected loop waveforms, said address generation section generating the address signals such that the selected loop waveforms are read out, on the basis of the phase management information corresponding thereto, with a phase difference corresponding to a difference between initial phases of the selected loop waveforms, to thereby cause respective phases of the reproduced loop waveforms, read out in accordance with the address signals, to be matched with each other.

9. A waveform forming device comprising:

a storage section that stores waveform data of a plurality of loop waveforms to be read out repeatedly and also stores phase management information in corresponding relation to the loop waveform, said plurality of loop waveforms including at least two loop waveform having different phase values corresponding to their respective initial addresses, and said phase management information being information that, when a corresponding one of the loop waveforms is reproduced from said storage section and combined with another reproduced loop waveform, is used for adjusting phases of the corresponding loop waveform and the other reproduced loop to match with each other; and an address generation section that generates looping address signals to repeatedly read out the waveform data of the stored loop waveforms, wherein said address generation section generates a first address signal for reading out the waveform data of a first one of said loop waveforms and a second address signal for reading out the waveform data of a second one of said loop waveforms in such manner that the first and second loop waveforms loop in different manners corresponding to a difference between the initial phases of said first and second loop waveforms so that said first and second loop waveforms, repeatedly read out in accordance with said first and second address signals, are adjusted in phase, wherein said address section performs phase adjustment between the first and second waveforms by using the phase management information corresponding to the selected loop waveforms to determine a readout address of said second loop waveform in such a manner that a phase of said second loop waveform matches with a current phase of said first loop waveform corresponding to readout addresses of said first loop waveform, and wherein a waveform of at least part of a sound is formed by combining said first and second loop waveforms reproduced and adjusted in phase by said address generation section.

10. A waveform forming device as recited in claim 9, further comprising a synthesis section that forms a waveform of at least part of a sound by cross-fade synthesizing said first and second loop waveforms reproduced and adjusted in phase by said address generation section.

11. A waveform forming device as recited in claim 9, further comprising a synthesis section that forms a waveform of at least part of a sound by mixing said first and second loop waveforms reproduced and adjusted in phase by said address forming section.

12. A waveform forming device as recited in claim 9, further comprising a synthesis section that forms a waveform of at least part of a sound by connecting together said first and second loop waveforms reproduced and adjusted in phase by said address forming section.

13. A waveform forming device as recited in claim 9 wherein management is made of information indicative of initial phases of the loop waveforms stored in said storage section and a difference between the initial phases of said first and second loop waveforms is determined on the basis of said information indicative of initial phases, and wherein said address generation section controls said first and second address signals to loop in different manners corresponding to the difference between the initial phases of said first and second loop waveforms.

14. A waveform forming device as recited in claim 9 wherein a difference between the initial phases of said first and second loop waveforms is determined by analyzing a phase relationship between said first and second loop waveforms to be combined together, and wherein said address generation section controls said first and second address signals to loop in different manners corresponding to the difference between the initial phases of said first and second loop waveforms.

15. A waveform forming method comprising:

a first step of storing waveform data of a plurality of loop waveforms to be read out repeatedly, including storing phase management information corresponding to the loop waveforms, said plurality of loop waveforms including at least two loop waveform having different phase values corresponding to their respective initial addresses, and said phase management information being information that, when a corresponding one of the stored loop waveform is read out and combined with another stored waveform that is read out, is used for adjusting the phases of the corresponding loop waveform and the other read out waveform so as to match the phases of the waveforms;

a second step of forming a waveform of at least part of a sound by selecting the two stored loop waveforms, repeatedly reading out the waveform data of the selected loop waveforms to thereby form at least two of reproduced loop waveforms corresponding to the selected loop waveforms and combining together the reproduced loop waveforms, wherein said second step of forming a waveform, while reading out a first loop waveform of the at least two of the loop waveforms, reads out a second loop waveform of the at least two of the loop waveforms and thereby combines said second loop waveform with said first loop waveform, said first loop waveform being read out ahead of said second loop waveform, and wherein said second step performs phase adjustment between the reproduced loop waveforms to be combined together by using the phase management information corresponding to the selected loop waveforms to determine a readout address of said second loop waveform in such a manner that a phase of said second loop waveform matches with a current phase of said first loop waveform corresponding to readout addresses of said first loop waveform.

16. A waveform forming method comprising:

storing waveform data of a plurality of loop waveforms to be read out repeatedly, including storing phase management information corresponding to the loop waveforms, said plurality of loop waveforms including at least two loop waveform having different phase values corresponding to their respective initial addresses, and said phase management information being information that, when a corresponding one of the stored loop waveform is read out and combined with another stored waveform that is read out, is used for adjusting the phases of the corresponding loop waveform and the other read out waveform so as to match the phases of the waveforms, the stored loop waveforms having given initial phases respectively;

generating looping address signals to repeatedly read out the waveform data of the stored loop waveforms, said step of generating generates a first address signal for reading out the waveform data of a first one of said loop waveforms and a second address signal for reading out the waveform data of a second one of said loop waveforms in such a manner that the first and second loop waveforms ioop in different manners corresponding to a difference between the initial phases of said first and second loop waveforms so that said first and second loop waveforms, reproduced by being repeatedly read out in accordance with said first and second address signals, are adjusted in phase by using the phase management information corresponding to the selected loop waveforms to determine a readout address of said second loop waveform in such a manner that a phase of said second loop waveform matches with a current phase of said first loop waveform corresponding to readout addresses of said first loop waveform; and forming a waveform of at least part of a sound by combining said first and second loop waveforms reproduced and adjusted in phase by said address generation section.

17. A machine-readable medium containing a group of instructions of a program executable by a processor to perform a method for forming a waveform of a sound based on readout of a waveform data from a storage section, said storage section storing waveform data of a plurality of loop waveforms and also storing phase management information corresponding to the loop waveforms, said plurality of loop waveforms including at least two loop waveform having different phase values corresponding to their respective initial addresses, and said phase management information being information that, when a corresponding one of the loop waveform is reproduced from said storage section and combined with another reproduced loop waveform, is used for adjusting phases of the corresponding loop waveform and the other reproduced loop to match with each other, said method comprising the steps of:

selecting the two loop waveforms stored in said storage section;

repeatedly reading out the waveform data of the selected loop waveforms to thereby form at least two of reproduced loop waveforms corresponding to the selected loop waveforms, wherein a first loop waveform of the at least two of the loop waveforms is read out ahead of a second loop waveform of the at least two of the loop waveforms;

performing phase adjustment between the reproduced loop waveforms by using the phase management information to determine readout addresses of said second loop waveform in such a manner that a phase of said second loop waveform matches with a current phase of said first loop waveform corresponding to readout addresses of said first loop waveform; and forming a waveform of at least part of a sound by combining the reproduced loop waveforms.

18. A machine-readable medium containing a group of instructions of a program executable by a processor to perform a method for forming a waveform of a sound based on readout of the waveform data from a storage section, said storage section storing waveform data of a plurality of loop waveforms, including storing phase management information corresponding to the loop waveforms, said plurality of loop waveforms including at least two loop waveform having different phase values corresponding to their respective initial addresses, and said phase management information being information that, when a corresponding one of the stored loop waveform is read out and combined with another stored waveform that is read out, is used for adjusting the phases of the corresponding loop waveform and the other read out waveform so as to match the phases of the waveforms, the loop waveforms stored in said storage section having given initial phases respectively, said method comprising the steps of:

generating looping address signals to repeatedly read out the waveform data of the stored loop waveforms, said first step generating a first address signal for reading out the waveform data of a first one of said loop waveforms and a second address signal for reading out the waveform data of a second one of said loop waveforms in such a manner that the first and second loop waveforms loop in different manners corresponding to a difference between the initial phases of said first and second loop waveforms so that said first and second loop waveforms, repeatedly read out in accordance with said first and second address signals, are adjusted in phase by using the phase management information corresponding to the selected loop waveforms to determine a readout address of said second loop waveform in such a manner that a phase of said second loop waveform matches with a current phase of said first loop waveform corresponding to readout addresses of said first loop waveform; and forming a waveform of at least part of a sound by combining said first and second loop waveforms reproduced and adjusted in phase by said first step.

* * * * *